United States Patent
Holmes et al.

(10) Patent No.: US 9,571,608 B2
(45) Date of Patent: Feb. 14, 2017

(54) TIMESLOT INTEROPERABILITY BETWEEN COMMUNICATING PLATFORMS

(75) Inventors: Christopher Kenneth Holmes, Ashtead (GB); Suraj Ajit, Loughborough (GB); John Gardiner, Preston (GB); Julian Frazer Ewert Johnson, Blackburn (GB)

(73) Assignee: BAE SYSTEMS PLC, London (GB)

( * ) Notice: Subject to any disclaimer, the term of this patent is extended or adjusted under 35 U.S.C. 154(b) by 301 days.

(21) Appl. No.: 13/980,016

(22) PCT Filed: Jan. 5, 2012

(86) PCT No.: PCT/GB2012/050007
§ 371 (c)(1),
(2), (4) Date: Sep. 13, 2013

(87) PCT Pub. No.: WO2012/098370
PCT Pub. Date: Jul. 26, 2012

(65) Prior Publication Data
US 2013/0343226 A1 Dec. 26, 2013

(30) Foreign Application Priority Data
Jan. 18, 2011 (GB) .................... 1100845.5

(51) Int. Cl.
*H04L 29/06* (2006.01)
*H04L 29/12* (2006.01)
(Continued)

(52) U.S. Cl.
CPC ........... *H04L 69/08* (2013.01); *H04B 7/18506* (2013.01); *H04B 7/2643* (2013.01); *H04L 12/52* (2013.01); *H04L 61/2596* (2013.01)

(58) Field of Classification Search
CPC ...... H04L 12/52; H04L 61/2596; H04L 69/08; H04L 7/2643; H04L 7/18506
See application file for complete search history.

(56) References Cited

U.S. PATENT DOCUMENTS 6,442,618 B1   8/2002   Phillips et al.
6,487,186 B1 * 11/2002   Young et al. .................. 370/336
(Continued)

FOREIGN PATENT DOCUMENTS

EP   1786166 A1   5/2007
GB   2358494 A   7/2001
(Continued)

OTHER PUBLICATIONS

International Search Report (PCT/ISA/210) issued on Jun. 25, 2012, by the European Patent Office as the International Searching Authority for International Application No. PCT/GB2012/050007.
(Continued)

*Primary Examiner* — Omer S Mian
(74) *Attorney, Agent, or Firm* — Maine Cernota & Rardin

(57) ABSTRACT

A method is disclosed of assessing timeslot interoperability between a first platform and a second platform communicating over a Time Division Multiple Access network. An exemplary method includes obtaining data representing a metamodel of communication characteristics of the first platform and the second platform, the metamodel including information regarding at least transmit timeslots for the first platform, and information regarding at least receive timeslots for the second platform. The method can be queried to assess interoperability between the transmit timeslots and the receive timeslots, for outputting timeslot interoperability data based on a result of the querying.

10 Claims, 30 Drawing Sheets

(51) Int. Cl.
  H04L 12/52 (2006.01)
  H04B 7/26 (2006.01)
  H04B 7/185 (2006.01)

(56) References Cited

U.S. PATENT DOCUMENTS

| | | | |
|---|---|---|---|
| 7,203,688 | B2 | 4/2007 | Hopkins |
| 7,424,029 | B1* | 9/2008 | Shum .......................... 370/445 |
| 8,332,348 | B1* | 12/2012 | Avery ............................ 706/61 |
| 2002/0087572 | A1 | 7/2002 | Hopkins |
| 2003/0158954 | A1* | 8/2003 | Williams ............... H04L 29/06 709/230 |
| 2003/0199266 | A1* | 10/2003 | Zavidniak .......... H04M 1/72511 455/410 |
| 2004/0174822 | A1 | 9/2004 | Bui |
| 2004/0246929 | A1 | 12/2004 | Beasley et al. |
| 2006/0155725 | A1* | 7/2006 | Foster et al. ................. 707/100 |
| 2006/0235882 | A1 | 10/2006 | Mateescu |
| 2006/0251047 | A1 | 11/2006 | Shenfield et al. |
| 2007/0250829 | A1 | 10/2007 | Hillier et al. |
| 2008/0043648 | A1* | 2/2008 | Buga .................... H04L 41/046 370/310 |
| 2008/0155008 | A1 | 6/2008 | Stiles et al. |
| 2008/0232345 | A1 | 9/2008 | Espina et al. |
| 2009/0036750 | A1 | 2/2009 | Weinstein et al. |
| 2009/0144324 | A1 | 6/2009 | Sturdy |
| 2011/0071709 | A1 | 3/2011 | Damiani et al. |
| 2012/0029900 | A1 | 2/2012 | Papariello |
| 2013/0009887 | A1 | 1/2013 | Huang |
| 2013/0013318 | A1 | 1/2013 | Huang |

FOREIGN PATENT DOCUMENTS

| | | |
|---|---|---|
| GB | 2409619 A | 6/2005 |
| WO | WO 2006/052235 A | 5/2006 |
| WO | WO 2007/015197 A | 2/2007 |
| WO | 2013121178 A1 | 8/2013 |

OTHER PUBLICATIONS

Written Opinion (PCT/ISA/237) issued on Jun. 25, 2012, by the European Patent Office as the International Searching Authority for International Application No. PCT/GB2012/050007.

W. Wang et al., "Message-Streams Oriented Hybrid Slot Allocation Protocol for Tactical Data Link System", Communication Networks and Services Research Conference, May 11, 2009, pp. 201-208.

G. Kotopoulos et al., "Querying MOF Repositories: The Design and Implementation of the Query Metamodel Language (QML)", Digital Ecosystems and Technologies Conference, Feb. 1, 2007, pp. 373-378.

L. Shenghua et al., "Stimulation and analysis of polling multiple access system for tactical data link by Matlab Stateflow modeling", Computer Design and Applications (ICCDA), Jun. 25, 2010, pp. V4-274-V4-277.

Jorn Guy Suss et al, "Towards Integrated Model-Driven Testing of Scada Systems Using the Eclipse Modeling Framework and Modelica", 19th Australian Conference on Software Engineering, IEEE, Mar. 26, 2008, pp. 149-159, XP/031241091.

United Kingdom Search Report issued on Oct. 19, 2011.

International Search Report and Written Opinion received for Patent Application No. PCT/GB2013/050279, mailed on May 2, 2013, 13 pages.

International Preliminary Report on Patentability and Written Opinion of the International Searching Authority received for Patent Application No. PCT/GB2013/050279, mailed on Aug. 28, 2014. 9 pages.

Mohd Syazwan Abdullah et al, "Modeling Knowledge Based Systems Using the Executable Modelling Framework (XMF)", Cybernetics and Intelligent Systems, 2004 IEEE Conference on Singapore, Dec. 1-3, 2004, vol. 2, Dec. 1, 2004, pp. 1055-1060, XP-010812886.

Written Opinion (PCT/ISA/237) mailed on Jul. 31, 2012 by the United Kingdom Patent Office as the International Searching Authority for International Application No. PCT/GB2012/051180.

International Search Report (PCT/ISA/210) mailed on Jul. 31, 2012 by the United Kingdom Patent Office as the International Searching Authority for International Application No. PCT/GB2012/051180.

Notification Concerning Transmittal of International Preliminary Report on Patentability (Forms PCT/IB/326 and PCT/IB/373) and the Written Opinion of the International Searching Authority (Form PCT/ISA/237) issued on Dec. 27, 2013, by the International Bureau of WIPO in corresponding International Application No. PCT/GB2012/051180. (8 pages).

GB Intellectual Property Office Search Report under Section 17(5) received for GB Patent Application No. 1202746.2 mailed Sep. 5, 2012, 3 pages.

He Zhao-xiong, et al., "Modeling and Simulation of Link-16 System in Network Simulator 2", 2010 International Conference on Multimedia Information Networking and Security, Nov. 4, 2010, 5 pages.

* cited by examiner

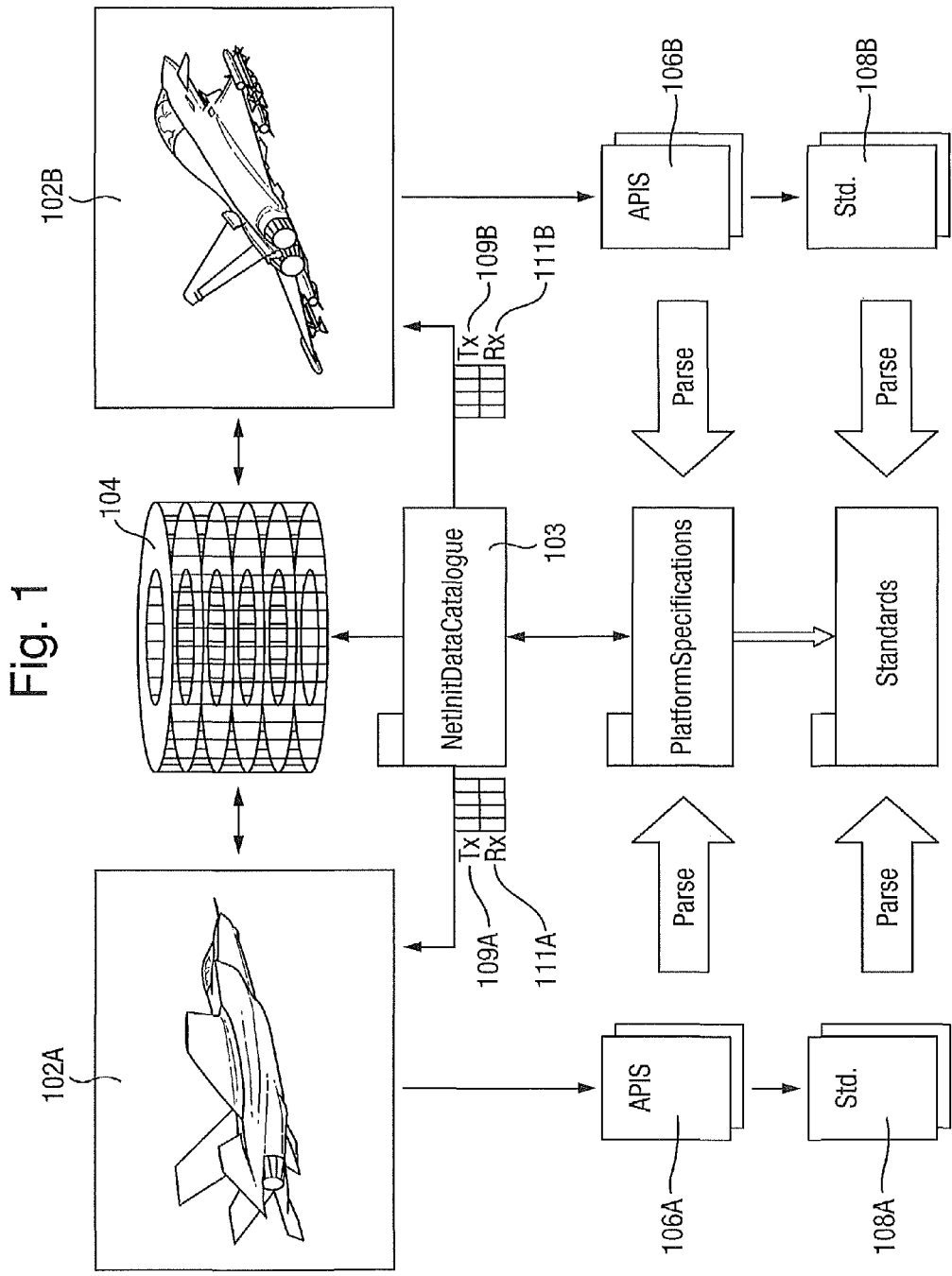

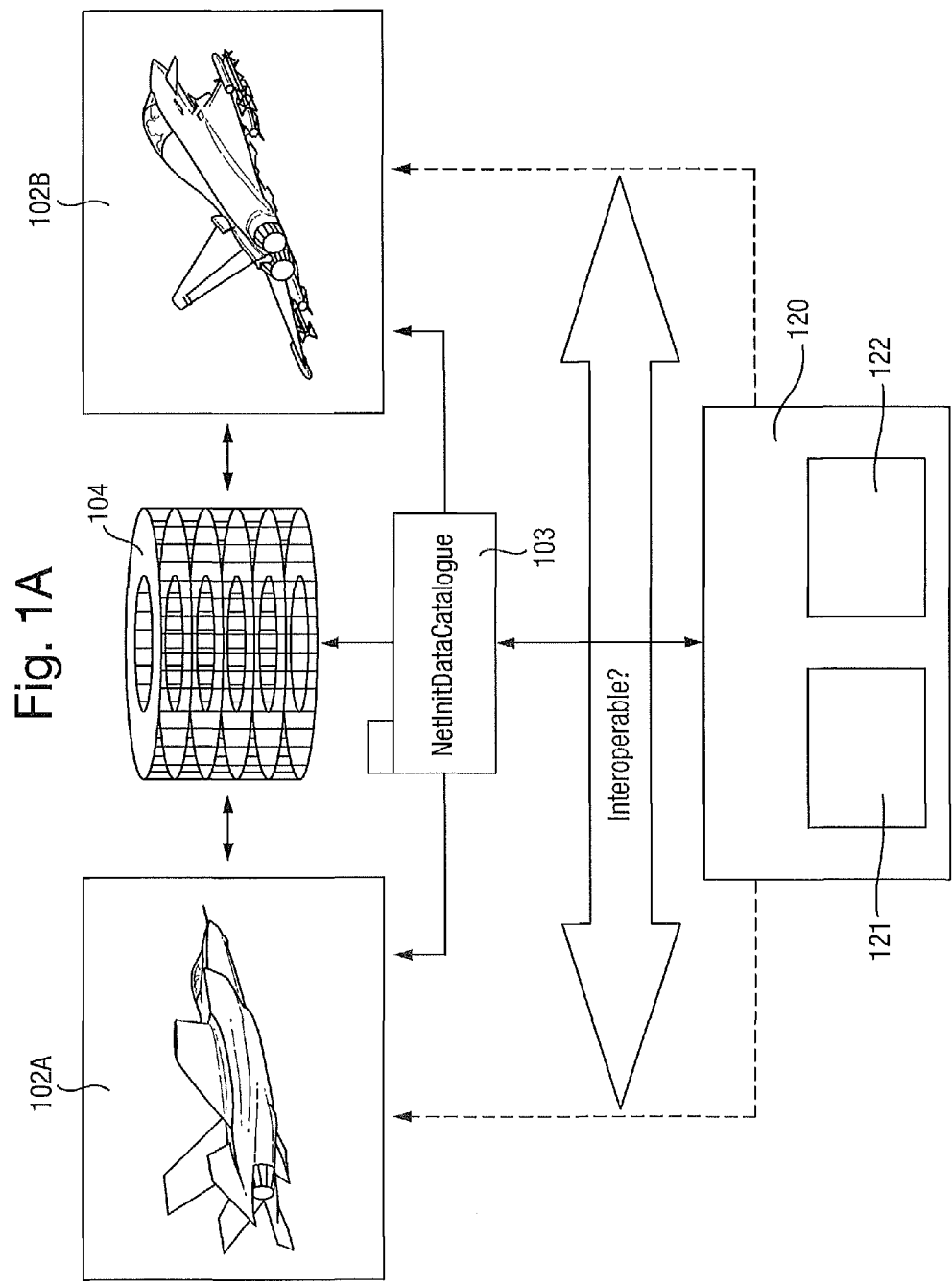

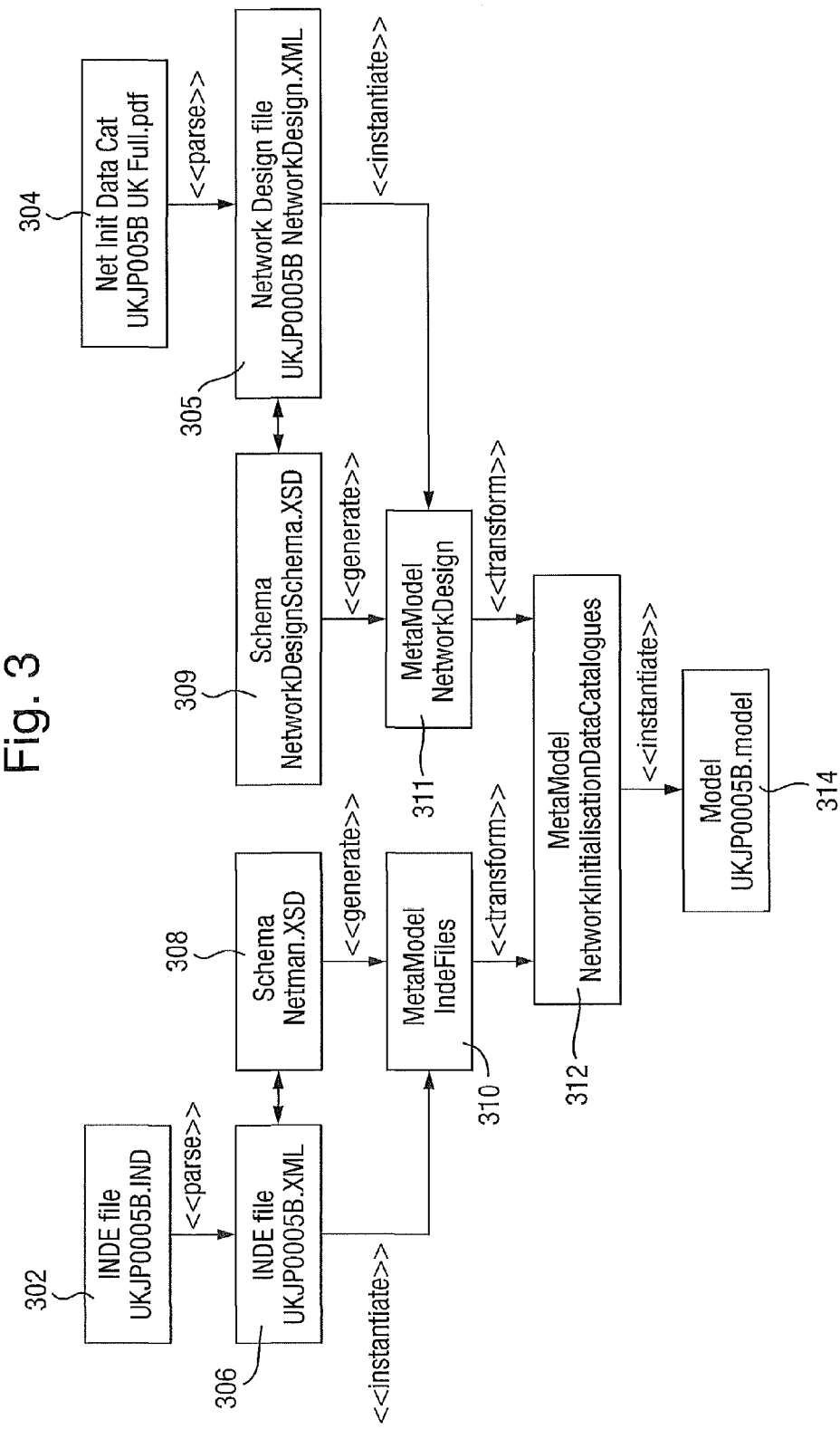

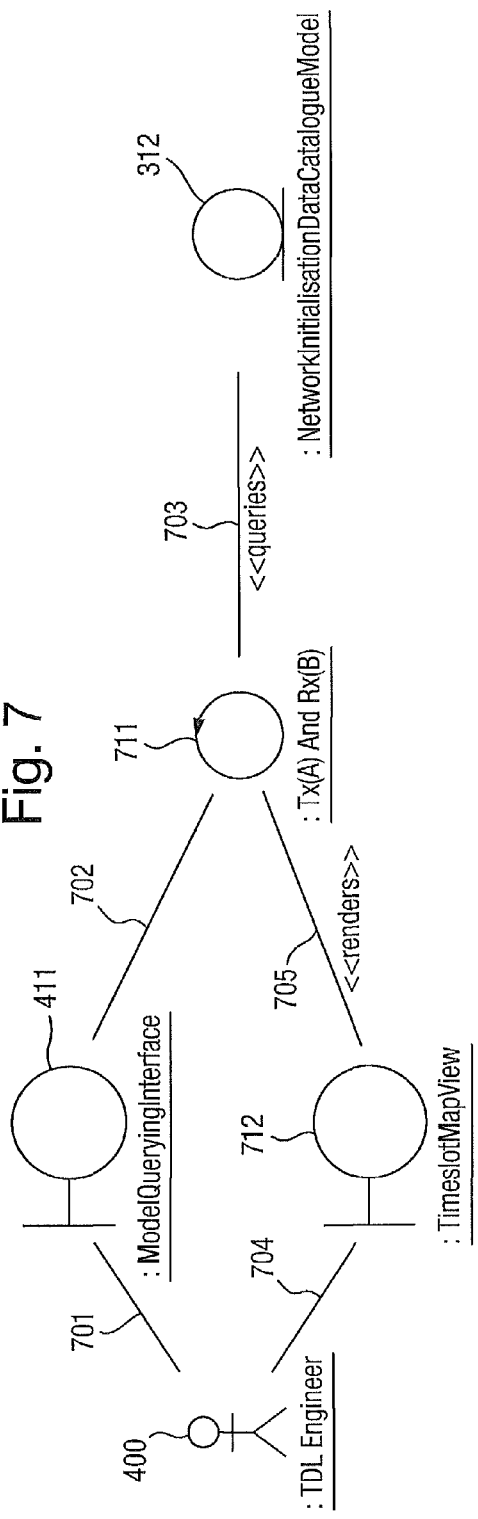
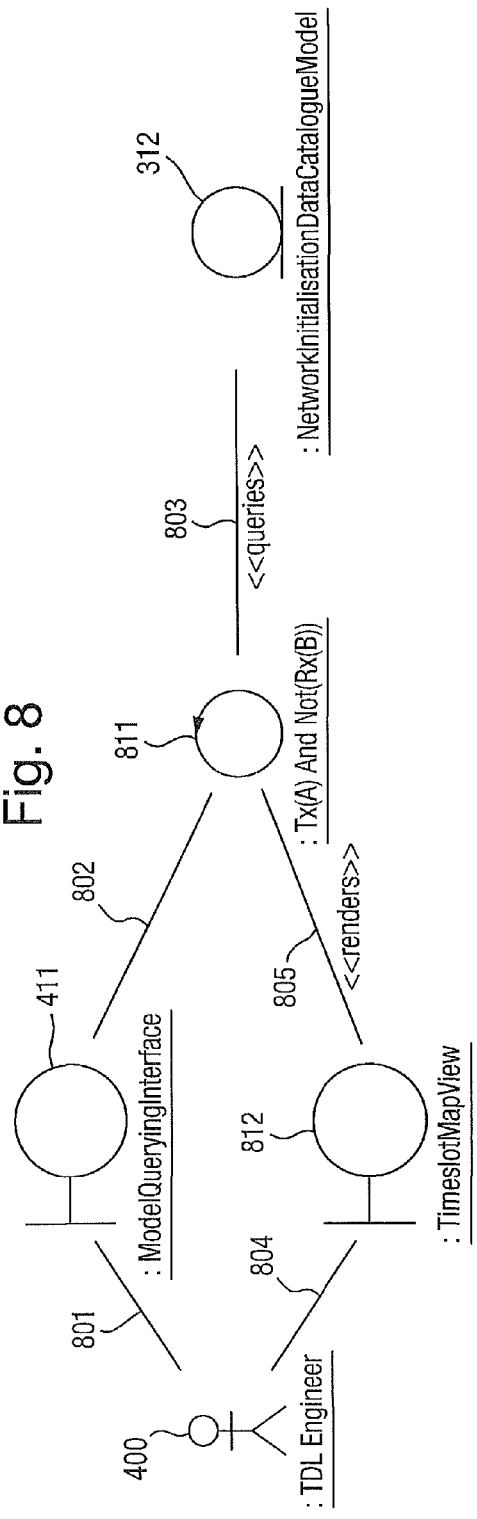

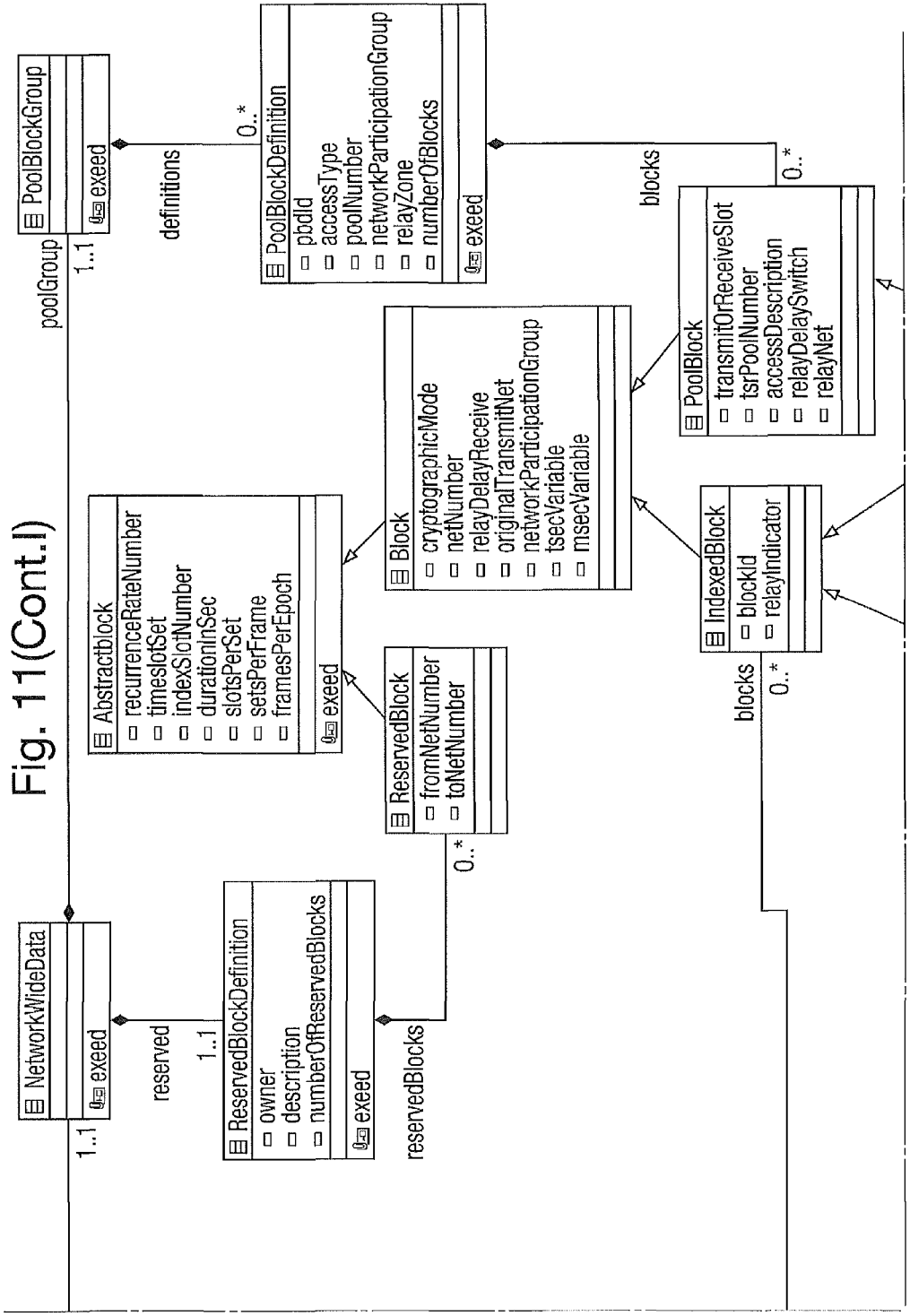
Fig. 11(Cont.1)

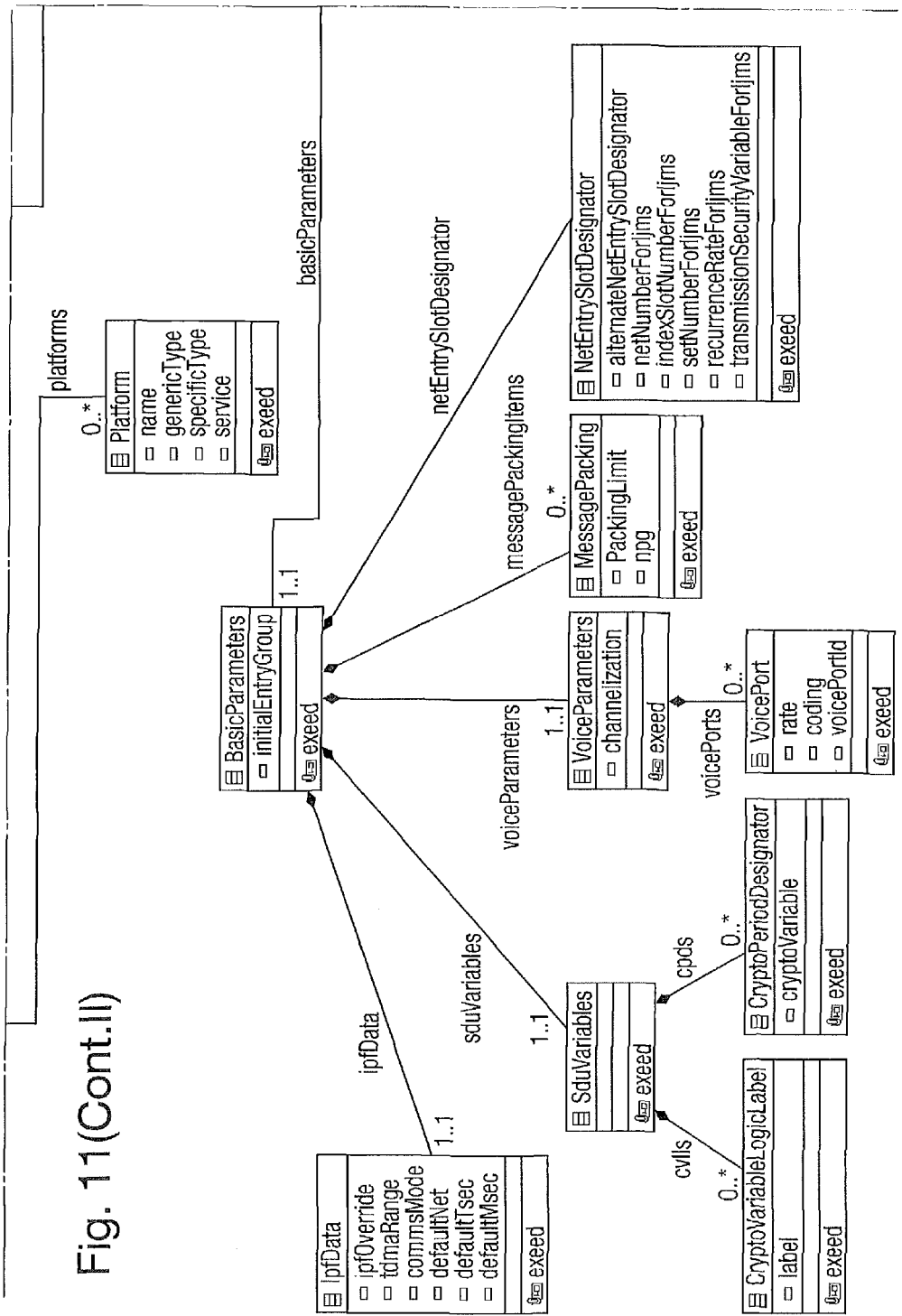
Fig. 11(Cont.II)

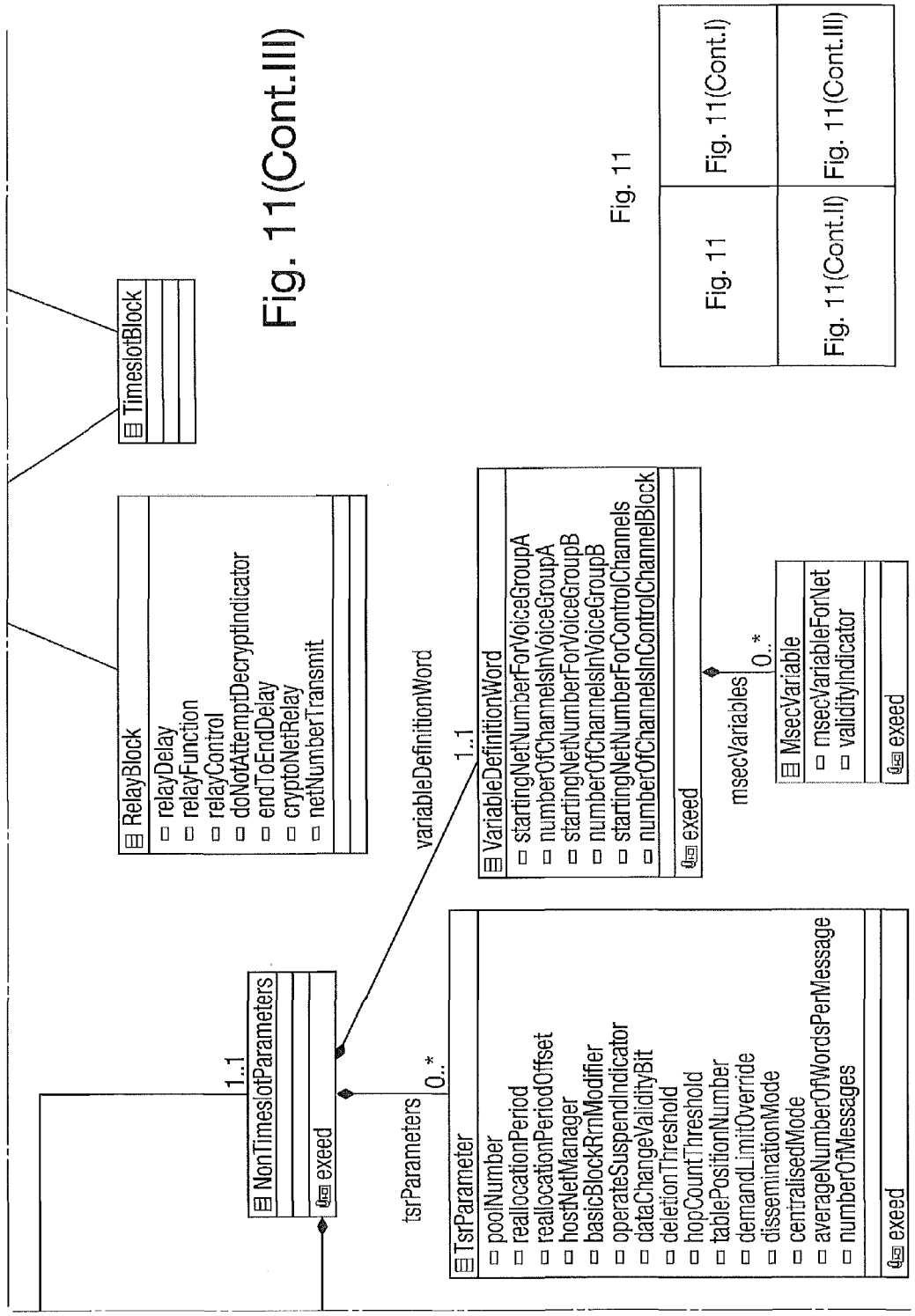

See Fig. 18

See Fig. 19

See Fig.21

This activity diagram describes the query: Ta ¬ Rb

Fig. 26

| Time slot Map for query: Typhoon[40]-40 Versus Typhoon[40]-40 | | | | | | | | |
|---|---|---|---|---|---|---|---|---|
| File Help | | | | | | | | |

Platform A (Transmitter) === Platform B (Receiver)  [Set A1]

| Platform A | | Platform B | | | | | |
|---|---|---|---|---|---|---|---|
| 0 | | 4 | ▦ | 2 | ▨ | 6 | ▓ |
| 256 | | 260 | ▦ | 258 | ▨ | 262 | ▓ |
| 128 | | 132 | ▦ | 130 | ▨ | 134 | ▓ |
| 384 | | 388 | ▦ | 386 | ▨ | 390 | ▓ |
| 64 | ▦ | 68 | ▦ | 66 | ▨ | 70 | ▓ |
| 320 | ▦ | 324 | ▦ | 322 | ▨ | 326 | ▓ |
| 192 | ▦ | 196 | ▦ | 194 | ▨ | 198 | ▓ |
| 448 | ▦ | 452 | ▦ | 450 | ▨ | 454 | ▓ |
| 32 | ▦ | 36 | ▦ | 34 | ▨ | 38 | ▓ |
| 288 | ▦ | 292 | ▦ | 290 | ▨ | 294 | ▓ |
| 160 | ▦ | 164 | ▦ | 162 | ▨ | 166 | ▓ |
| 416 | ▦ | 420 | ▦ | 418 | ▨ | 422 | ▓ |
| 96 | ▦ | 100 | ▦ | 98 | ▨ | 102 | ▓ |
| 352 | ▦ | 356 | ▦ | 354 | ▨ | 358 | ▓ |
| 224 | ▦ | 228 | ▦ | 226 | ▨ | 230 | ▓ |
| 480 | ▦ | 484 | ▦ | 482 | ▨ | 486 | ▓ |
| 16 | ▧ | 20 | ▦ | 18 | ▨ | 22 | ▓ |
| 272 | ▧ | 276 | ▦ | 274 | ▨ | 278 | ▓ |
| 144 | ▧ | 148 | ▦ | 146 | ▨ | 150 | ▓ |
| 400 | ▧ | 404 | ▦ | 402 | ▨ | 406 | ▓ |
| 80 | ▧ | 84 | ▦ | 82 | ▨ | 86 | ▓ |
| 336 | ▧ | 340 | ▦ | 338 | ▨ | 342 | ▓ |
| 208 | ▧ | 212 | ▦ | 210 | ▨ | 214 | ▓ |
| 464 | ▧ | 468 | ▦ | 466 | ▨ | 470 | ▓ |
| 48 | ▧ | 52 | ▦ | 50 | ▨ | 54 | ▓ |
| 304 | ▧ | 308 | ▦ | 306 | ▨ | 310 | ▓ |
| 176 | ▧ | 180 | ▦ | 178 | ▨ | 182 | ▓ |
| 432 | ▧ | 436 | ▦ | 434 | ▨ | 438 | ▓ |
| 112 | ▧ | 116 | ▦ | 114 | ▨ | 118 | ▓ |
| 368 | ▧ | 372 | ▦ | 370 | ▨ | 374 | ▓ |
| 240 | ▧ | 244 | ▦ | 242 | ▨ | 246 | ▓ |
| 496 | ▧ | 500 | ▦ | 498 | ▨ | 502 | ▓ |
| 8 | ▓ | 12 | ▦ | 10 | ▨ | 14 | ▓ |
| 264 | ▓ | 268 | ▦ | 266 | ▨ | 270 | ▓ |
| 136 | ▓ | 140 | ▦ | 138 | ▨ | 142 | ▓ |
| 392 | ▓ | 396 | ▦ | 394 | ▨ | 398 | ▓ |
| 72 | ▓ | 76 | ▦ | 74 | ▨ | 78 | ▓ |
| 328 | ▓ | 332 | ▦ | 330 | ▨ | 334 | ▓ |
| 200 | ▓ | 204 | ▦ | 202 | ▨ | 206 | ▓ |
| 456 | ▓ | 460 | ▦ | 458 | ▨ | 462 | ▓ |
| 40 | ▓ | 44 | ▦ | 42 | ▨ | 46 | ▓ |
| 296 | ▓ | 300 | ▦ | 298 | ▨ | 302 | ▓ |

TIMESLOT INTEROPERABILITY BETWEEN COMMUNICATING PLATFORMS

BACKGROUND TO THE INVENTION

The present invention relates to timeslot interoperability between communicating platforms and more particularly to assessing timeslot interoperability between platforms communicating over a Time Division Multiple Access network.

Time Division Multiple Access (TDMA) architectures are used for many applications. One example is Tactical Data Links (TDLs), which comprises a family of related technologies that have been developed over many years to coordinate and control the dissemination of information within the battlespace to support joint and combined operations. Consequently, various forms of TDL have been developed to support specific battle groups. The TDLs feature differing waveforms, bandwidths, protocols and capabilities.

One of the most widely used TDLs is Link 16 (or TADIL-J). At its most basic, the Link 16 network is divided up into a number of nets, and each net is subdivided into a number of timeslots that are allocated to participants for the transmission of messages; each timeslot is 7.8125 mS. Hence, for the network to operate successfully, each participant must know when to transmit, when to receive, and when to do neither. This information is provided via one or more documents published by the agency responsible for the network design, such as the Joint Data Link Management Organisation (JDLMO). The network design information is provided in the form of the human readable Network Initialisation Data Catalogue, a large PDF document, and, in the case of some platforms, a machine readable network initialisation (INDE) file.

Conventionally, in order to ascertain the compatibility of each network design the TDL practitioners analyse the machine-readable INDE file to confirm whether a particular platform will be able to receive the relevant timeslots. The source material is terse and can be difficult to understand, incurring a significant learning curve. The TDL practitioners typically manually execute a number of common queries over the terse INDE file. The INDE file, whilst in some ways highly explicit, also contains implicit data, such as the seemingly arbitrary groups of platforms, such that practitioners must consult the Network Initialisation Data Catalogue in order to identify members of each group. Also, in order to confirm timeslot compatibility between two platforms, practitioners must be cognisant of a number of implicit transmit/receive rules based on, for instance, the default net used within the TDL. Such analysis based on the vast amount of very detailed information is time consuming and prone to human error.

Embodiments of the present invention are intended to address at least some of the problems discussed above.

SUMMARY OF THE INVENTION

Embodiments of the invention can model the underlying semantics of the network design based on both the INDE file and a fragment of the Network Initialisation Data Catalogue such that a network design can be captured, validated against well-formedness constraints and queried via a simple user interface. The results of each query may be presented graphically in the form of a timeslot map (an accepted standard representation of a set of timeslots).

According to a first aspect of the present invention there is provided a method of assessing timeslot interoperability between a first platform and a second platform communicating over a Time Division Multiple Access network, the method including:

obtaining data representing a metamodel of communication characteristics of the first platform and the second platform, the metamodel including information regarding at least transmit timeslots for the first platform, and information regarding at least receive timeslots for the second platform;

querying the model to assess interoperability between the transmit timeslots of the first platform and the receive timeslots of the second platform, and outputting timeslot interoperability data based on a result of the querying.

A metamodel typically comprises a precise definition of the constructs and rules needed for creating semantic models. The metamodel can underpin the model by defining some domain of relevance, constraining the scope of those models that are declared valid within this domain. A metamodel may be used to attach semantics to a model, such that not only are the concepts to be modelled described, but also their meaning. The metamodel used in embodiments of the present system will normally be executable, such that models (instances of the metamodels) may be checked by a suitable tool for validity against the metamodel. A metamodel may be considered analogous to the schema used to define the structure of a database in terms of the entities and relationships.

The method may include generating the metamodel. The metamodel may be generated from at least one source file. The source files may include a human-readable Network Initialisation Data Catalogue, and a machine-readable network initialisation file. The method may further include converting the at least one source file into a machine processable format, e.g. XML. The method may further include validating the machine processable format information against a schema, e.g. an XML schema. The method may include generating an initial metamodel based on the schemata and populating the initial metamodel with specific data based on the at least one source file conforming to the schema used to generate the metamodel.

The metamodel may include information regarding said transmit timeslots explicitly included in the at least one source file. The metamodel may include information regarding said transmit timeslots or said receive timeslots implicitly included in the at least one source file. For instance, the metamodel may include information regarding said receive timeslots of the second platform corresponding to all timeslots transmitted in its default net. The metamodel may include information regarding said receive timeslots based on any special case Network Participation Groups (NPGs) of which the second platform is a member. The special case receive timeslots can be timeslot blocks transmitted by the first platform which the second platform can receive if it is not using these timeslot blocks to transmit. The metamodel may include information relating to user-defined and/or domain-specific allocation of special case Network Participation Groups (NPGs) of which the first and the second platforms are members in order to identify additional, non-standard timeslot interoperability between the first and the second platforms.

The querying may include identifying the transmit timeslots of the first platform that the second platform is able to receive (either explicitly or implicitly).

The querying may include identifying the transmit timeslots of the first platform that the second platform is unable to receive (either explicitly or implicitly).

The querying may include identifying all the transmit timeslots of the first platform and all the (implicit and explicit) receive timeslots of the second platform.

The time division multiple access network may comprise a Tactical Data Link (TDL) network, such as Link 16 TDL.

According to other aspects of the present invention there are provided systems configured to execute methods substantially as described herein.

According to other aspects of the present invention there is provided a computer program element comprising: computer code means to make the computer execute methods substantially as described herein. The element may comprise a computer program product.

Whilst the invention has been described above, it extends to any inventive combination of features set out above or in the following description. Although illustrative embodiments of the invention are described in detail herein with reference to the accompanying drawings, it is to be understood that the invention is not limited to these precise embodiments. As such, many modifications and variations will be apparent to practitioners skilled in the art. Furthermore, it is contemplated that a particular feature described either individually or as part of an embodiment can be combined with other individually described features, or parts of other embodiments, even if the other features and embodiments make no mention of the particular feature. Thus, the invention extends to such specific combinations not already described.

BRIEF DESCRIPTION OF THE DRAWINGS

The invention may be performed in various ways, and, by way of example only, embodiments thereof will now be described, reference being made to the accompanying drawings in which:

FIG. 1 schematically illustrates an example of timeslot interoperability analysis for two platforms communicating over a TDMA network;

FIG. 1A includes features from FIG. 1 and further shows a computing device configured to execute a method of assessing timeslot interoperability;

FIG. 3 outlines a model generation process used by an example implementation of the timeslot interoperability analysis;

FIG. 3B illustrates an example of XML generated by the parser;

FIG. 3C shows a fragment of an XML schema generated from an INDE file;

FIG. 3D shows a fragment of an XML schema generated from a Network Design file;

FIGS. 4-11 are collaboration diagrams illustrating steps performed by embodiments;

FIG. 26 is another example screen display of a timeslot map, and

DESCRIPTION OF THE PREFERRED EMBODIMENT

FIG. 1 shows a first platform 102A and a second platform 102B. In the example the platforms comprise two different types of aircraft, although the term "platform" is intended to be interpreted broadly and can cover any type of vehicle, installation, etc, that needs to be put into communication with another platform of the same or different type. In the example the platforms communicate tactical data via a Link 16 TDL network 104, although it will be understood that embodiments of the present invention can be produced for dealing with any type of data being transferred over any type of TDMA network.

The Link 16 communication characteristics for each of the platforms 102A, 102B are defined by respective specifications, which in the example take the form of the underlying communication link standard(s) (the base standard) 108A and 108B (which may or may not be the same), the elements of the base standard implemented by the platform 106A and 106B, and the network configuration to be used 103. The network configuration (the Network Initialisation Data Catalogue) defines a particular configuration of the Link 16 TDL network over which the tactical data messages implemented by the relevant platforms are to be exchanged. The Network Initialisation Data Catalogue may be provided in a variety for formats, such as the machine readable network initialisation (INDE) file. The Network Initialisation Data Catalogue describes (amongst other aspects) the timeslots allocated to each platform for transmission and reception within the network 104. Transmission and reception timeslots for the first platform 102A are illustrated schematically at 109A, 111A, respectively, and at 109B, 111B, respectively, for the second platform 102B.

Figure 2:
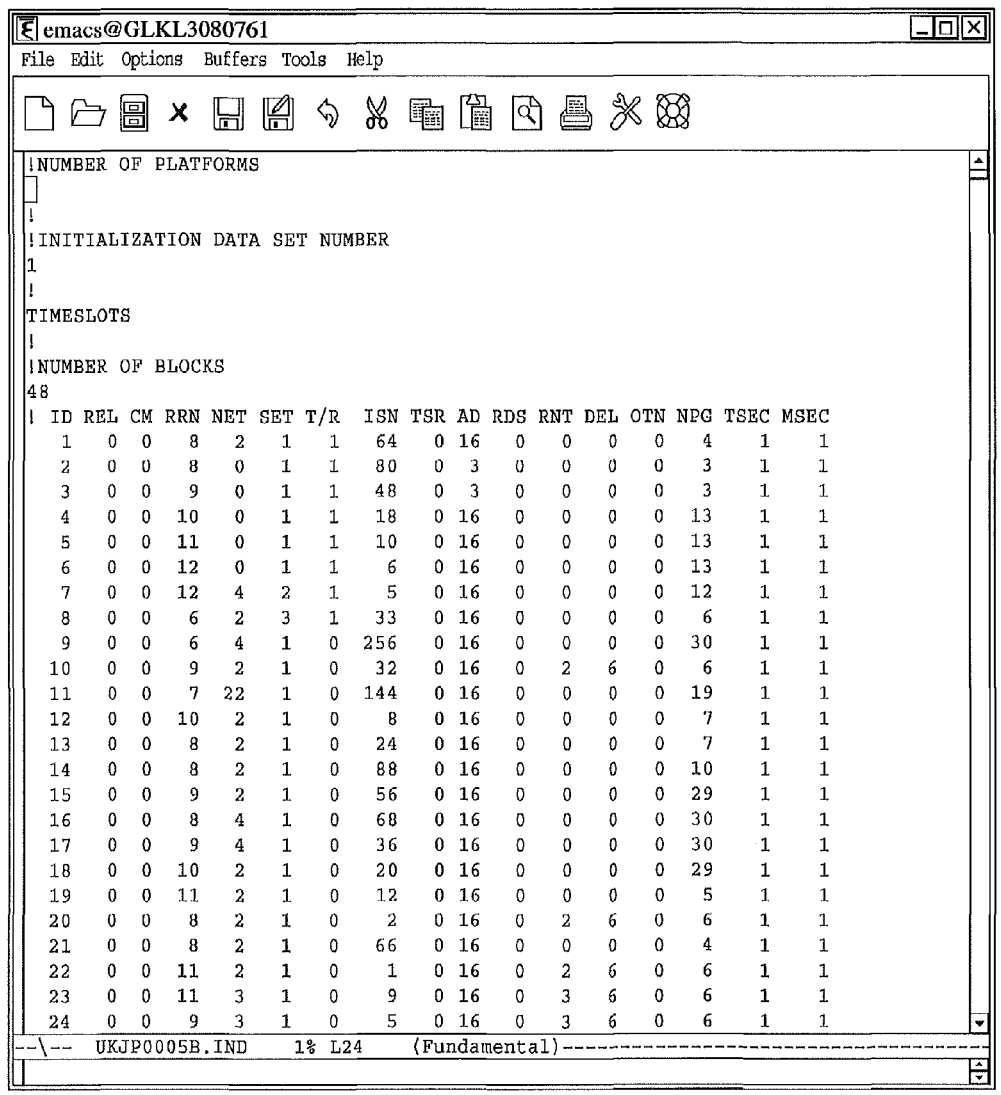
FIG. 2 is partial example of a network initialisation file.

The network is designed in accordance with an accepted idiomatic architecture in the form of a number of communities, each containing a number of participants. Each participant is allocated a number of initialisation data sets, each containing a number of timeslot blocks, with each timeslot block belonging to one of the three sets. The INDE file suffers from a number of drawbacks that serve to impede its accessibility to the TDL engineer. First, it conforms to a terse text-based format, as shown in the partial example of FIG. 2. It also contains implicit information, such as:

Timeslots are identified explicitly as either transmit or receive; however, implicit rules permit platforms to receive via the default net and also via a number of special case Network Participation Groups (NPGs).

Participants may be collected into groups of arbitrary size; however the INDE file does not identify the notion of groups and also does not identify individual members of each group, identifying only the first member of each group.

Participants are members of a community; however, the INDE file does not recognise the notion of a community.

Thus, the INDE file requires skill to read and understand and cannot be fully understood without recourse to the Network Initialisation Data Catalogue during conventional manual analysis.

FIG. 1A includes features from FIG. 1 (identified by common reference numerals) and further schematically shows a computing device 120 including a processor 121 and a memory 122 storing code for executing a method of assessing timeslot interoperability. The computing device may be located onboard either or both of the platforms 102A, 102B, or at a remote location. The method processes data based on the Network Initialisation Data Catalogue files to instantiate a metamodel, illustrated schematically at 103, that represents timeslot communication characteristics of all platforms that may comprise the network 104. The metamodel can then be used for running queries that assist with assessing timeslot interoperability between any member platforms of the network.

FIG. 3 gives an overview of how an instantiated metamodel is generated for use in timeslot interoperability analysis. Embodiments of the invention are based around a metamodel of the network design, which has been inferred from analysis of two primary data sources: the INDE file 302, and the network design description provided by the Network Initialisation Data Catalogue 304. The inferred metamodel combines the relevant concepts from the source data sets into a single, coherent metamodel referred to as the Network Initialisation Data Catalogue 312.

The INDE file is parsed into a common machine-processable format, e.g. XML format version 306. In one embodiment this can be done using the known tool ANTLR (ANother Tool for Language Recognition), although the skilled person will understand that suitable alternative tools (e.g. lex and yacc) could be used. A thorough description of ANTLR may be found in Parr, T., 'The Definitive ANTLR Reference—Building Domain-Specific Languages', The Pragmatic Bookshelf, 2008, for example.

The parser was developed via an analysis of the structure of the source document (the INDE file) and was aided via the language description provided by the associated Interface Control Definition provided in Backus-Naur Format (BNF). The BNF description of the source document may be found in the unclassified NATO Interface Control Definition for the International Exchange of MIDS/JTIDS Network Design Data—NETMAN T1/Rev 3.

A grammar expressed in ANTLR takes the form of a set of rules, each rule has a name and comprises a number of lexical pattern matches (to recognise tokens in the input stream) and associated actions relating to the objects to be generated in response to the matching of a token (actions are often used in conjunction with templates to emit structured text). A simple example illustrates the use of ANTLR. The rule 'originationDate' looks for the tokens 'ORIGINATION' 'DATE' and a date in the form 'dd-mm-yy' where dd, mm and yy are numeric types; a side-effect is that the values of the source tokens are stored in dd, mm and yy for later use.

```
originationDate
    :   'ORIGINATION' 'DATE'
        dd = NUMERIC '-' mm = NUMERIC '-' yy = NUMERIC
        ->template(day={$dd.text}, month={$mm.text},
year={$yy.text})
<<\<OriginationDate date="<day>-<month>-<year>"/\> >>
```

Hence the rule 'originationDate' matches the following text fragment of an INDE file:

```
!ORIGINATION DATE
14-01-08
```

The production 'template(<args>)' then generates structured text output using the action enclosed within the double angle brackets '<<' and '>>', emitting the resulting text (which is valid XML):

```
<OriginationDate date="14-01-08"/>
```

A fragment of code taken from an example parser developed in ANTLR is given below:

```
grammar Netman;
    options {output=template;}
    /** grammar rules */
    netman   :   b = body
                ->template(docBody={$b.st},
dataTypeRef={"http://www.w3.org/2001/XMLSchema-instance"},
schemaLoc={"Netman_v9.xsd"})
    <<\<?xml version='1.0' encoding='UTF-8'?\>
    \<Netman xmlns:xsi="<dataTypeRef>"
xsi:noNamespaceSchemaLocation="<schemaLoc>"\>
        <docBody rules elided>
    \</Netman\> >>
    ;
    body     :   'NETWORK' 'ID' '/' 'NETWORK' 'VERSION'
'NUMBER' '/' 'NETWORK' 'APPROVAL' 'LEVEL'
        id = STRLIT
        verNo = ALPHA
        appLevel = NUMERIC
        hdr = header
        pd = platformData
        gd = globalData
        'END' 'OF' 'DATA'
        ->template(dsgId={$id.text},
        dsgVerNo={$verNo.text},
dsgAppLevel={$appLevel.text}, header={$hdr.st}, data={$pd.st},
globalData={$gd.st})
    <<\<NetworkDesign name=<dsgId> version="<dsgVerNo>"
approvalLevel="<dsgAppLevel>"\>
        <header>
        <data>
        <globalData>
    \</NetworkDesign\> >>
    ;
```

An example of the XML generated via the example parser is given below:

```
<?xml version='1.0' encoding='UTF-8'?>
<Netman
xmlns:xsi=http://www.w3.org/2001/XML.Schema.instance
xsi:noNamespaceSchemaLocation="Netman_v9.xsd">
    <NetworkDesign     name="UKJP0005B"     version="B"
approvalLevel="2">
        <Header>
            <OriginationDate date="14-01-08"/>
            <Volume number="1" of="1"/>
            <ReleaseAuthority name="JDLMO"/>
            <SourceSystem     name="UK     TNDS"
version="3.2"/>
            <Summary>
            ...
        </Header>
        <PlatformData>
        <NetworkWideData>
        <NetworkDesign>
</Netman>
```

Figure 3A:
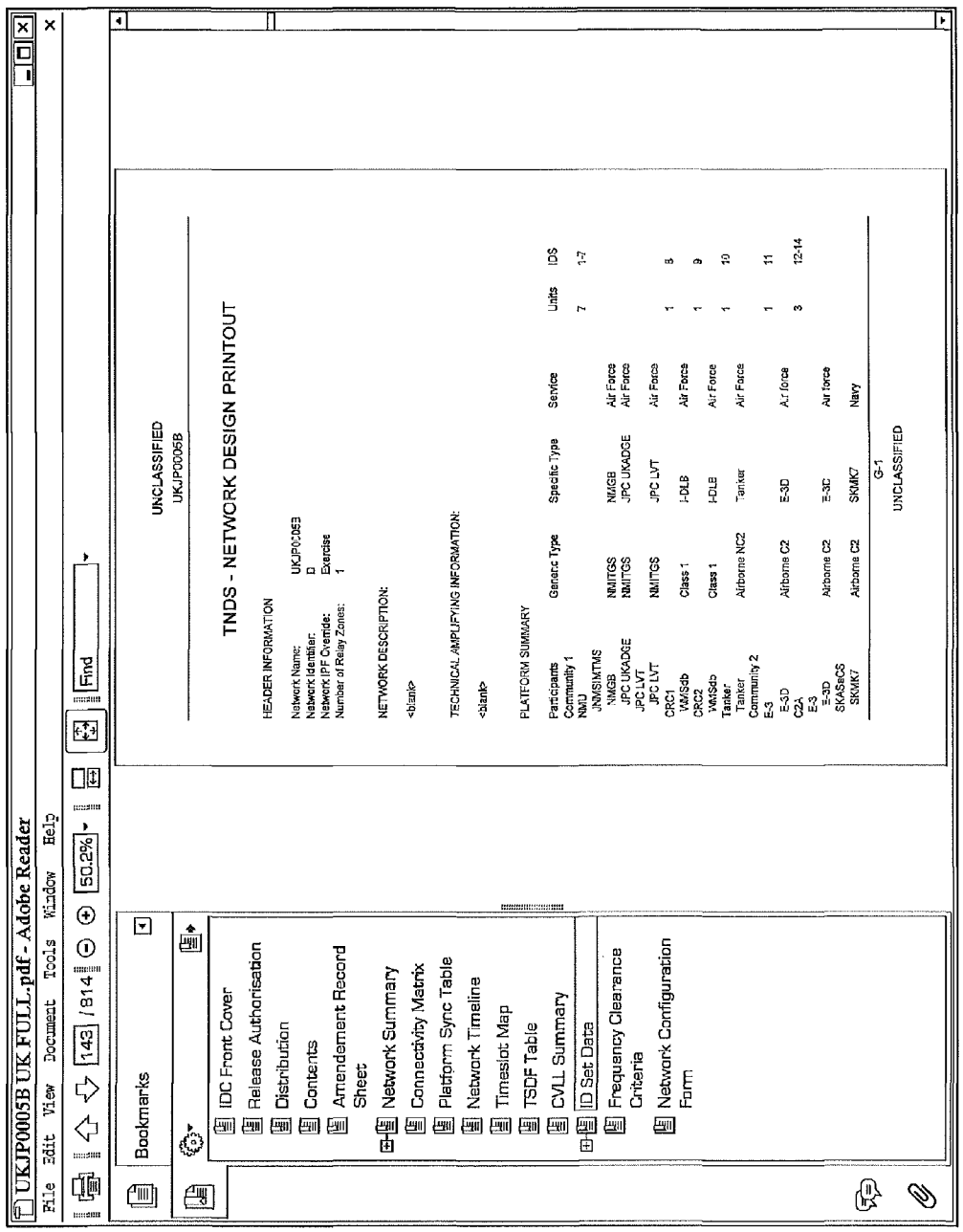
FIG. 3A shows example source data from a Network Initialisation Data Catalogue to be parsed into XML by as part of the timeslot interoperability analysis method.
Figure 3B:
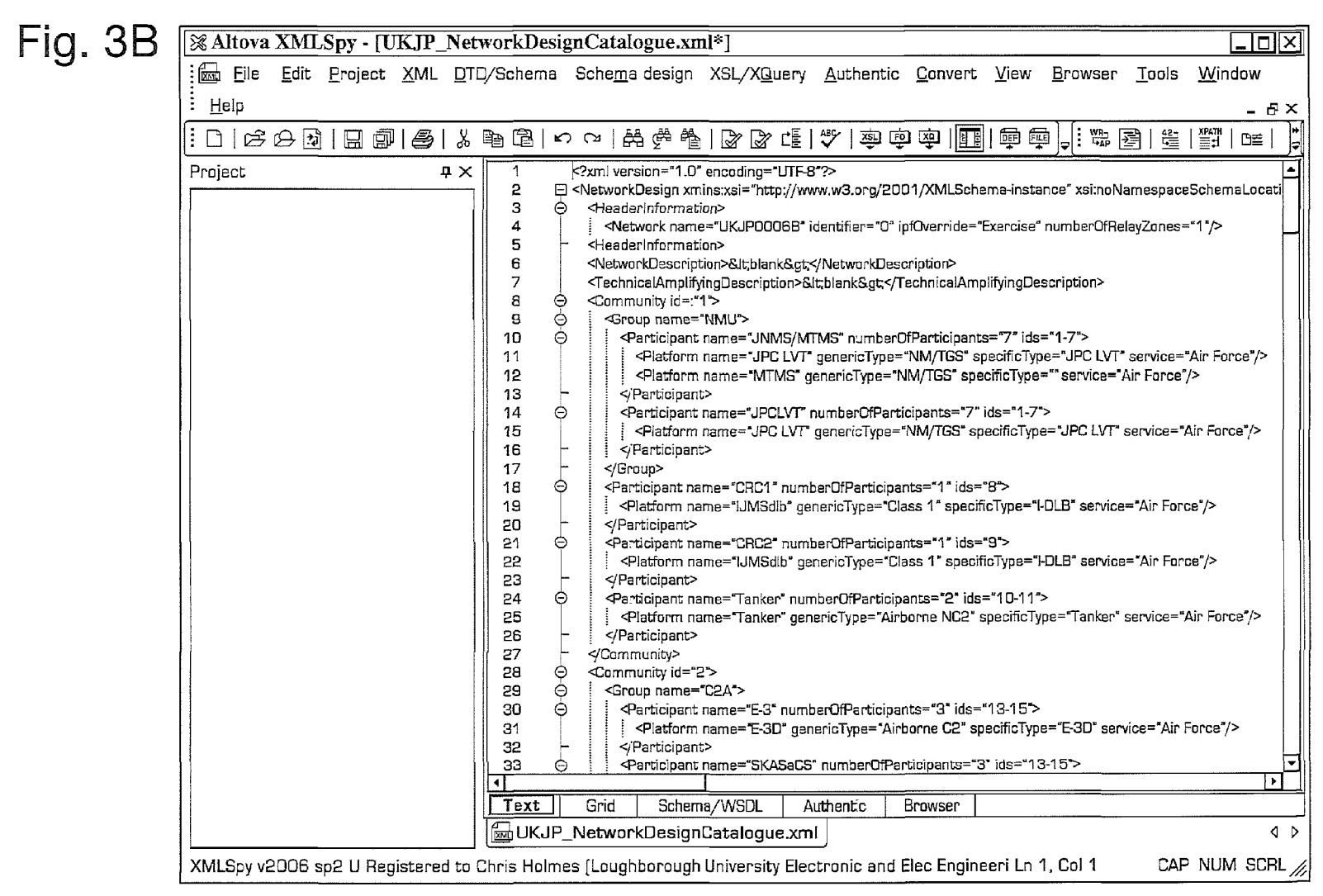

Network design information from Appendix G (Network Design) of the Network Initialisation Data Catalogue 304 is also parsed into XML format version 305 via a parser written in a programming language such as Java, again, there are clearly a number of alternative approaches that could be taken. FIG. 3A provides an example of the source data (taken from a PDF version of the Network Initialisation Data Catalogue as published by the network design authority), and FIG. 3B illustrates an example of the XML generated by the parser.

Validity and well-formedness of the XML documents can be enforced by associating an XML document (such as is generated via ANTLR) with an XML schema. In the case of the example implementation of the tool, both the XML version of the INDE file 306 and the XML version of the Network Design section of the Network Initialisation Data Catalogue 305 are each validated against an XML schema that has been derived from source material (e.g. an Interface Control Definition for the INDE file), and by observation and analysis.

Figure 3C:
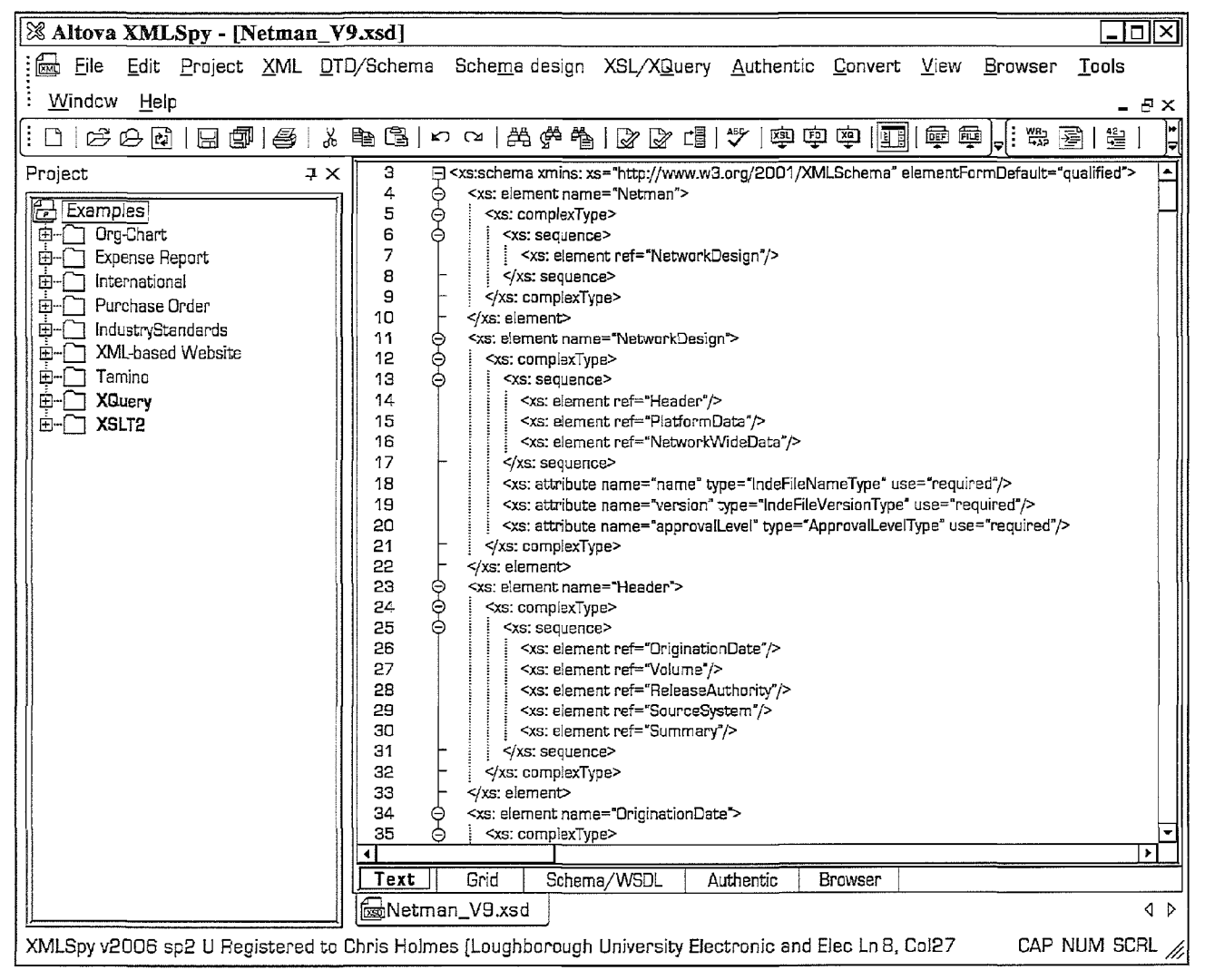
Figure 3D:
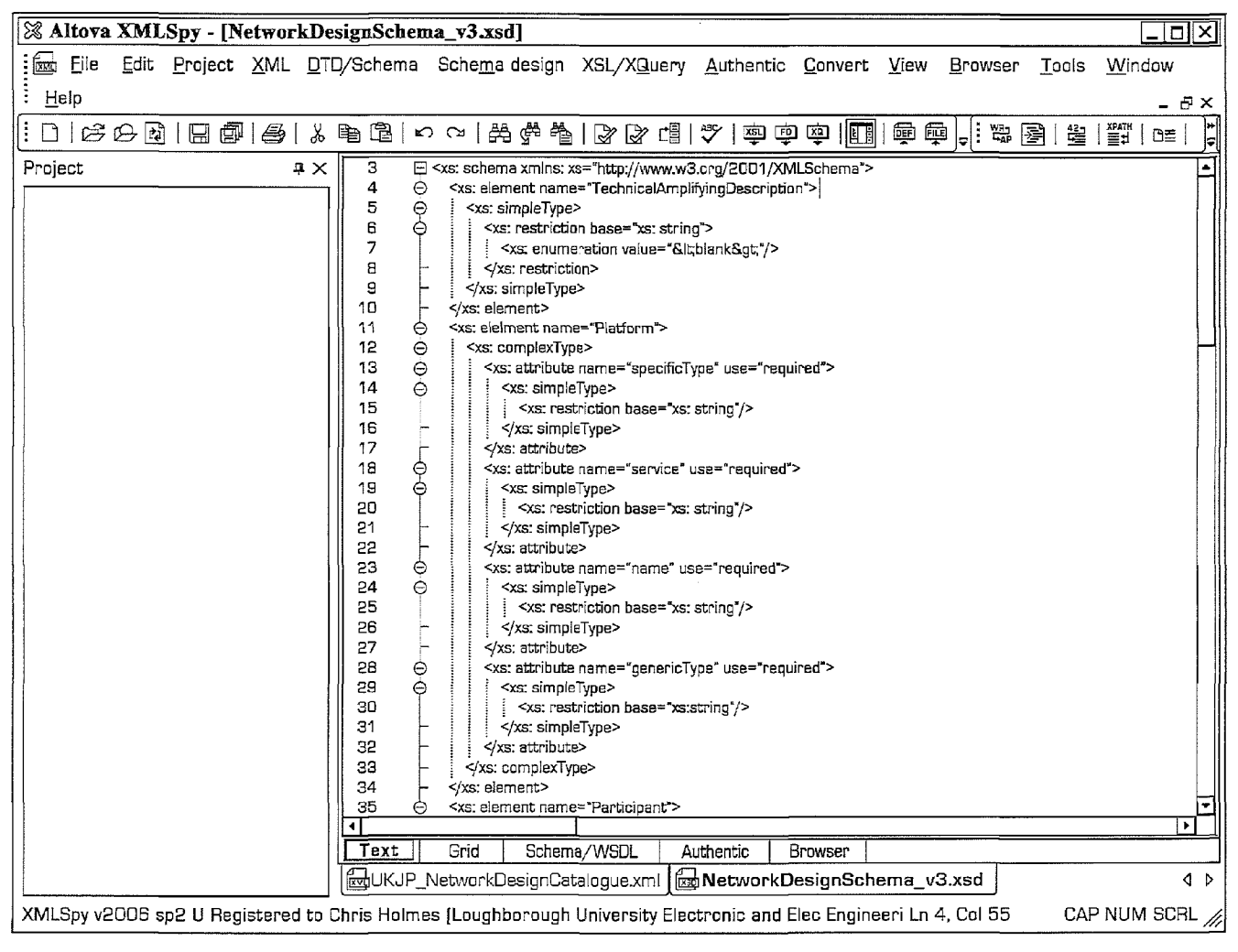

FIG. 3C shows a fragment of the XML schema 308 for the XML version of the INDE file 306, and FIG. 3D provides a fragment of the XML schema 309 for the Network Design file 305.

The source XML documents are used to populate auto-generated metamodels 310, 311 based on the XML schemata using the Eclipse Modelling Framework (EMF), see, for example, Stienberg, D., Budinsky, F., Paternostro, M., Merks, E., 'EMF—Eclipse Modeling Framework', $2^{nd}$ ed., Addison-Wesley, 2008. The overarching network design metamodel 312 is populated from the populated metamodels 310, 311 relating to the individual source documents. This can be achieved via model transformation using the known EPSILON Transformation Language (ETL; see www.eclipse.org/gmt/epsilon, for example), although alternative approaches may also be feasible, e.g. XMF from Xactium/Ceteva, the EMF-based ATLAS Transformation Language (ATL), etc. The approach followed by the example implementation is illustrated in FIG. 3:

The INDE file 302 is parsed into XML 306 via an application written using ANTLR

The INDE XML document 306 may be validated against its schema 308 by a validating XML processor (e.g. XMLSpy)

The NETMAN schema 308 is used to generate a metamodel in eCore 310 (part of the EMF framework) using standard EMF generative capabilities The eCore metamodel 310 is populated from the source INDE XML document 306 using standard EMF parsing capabilities The Platform Summary information provided by the Network Initialisation Data Catalogue 304 is parsed into the Network Design XML document 305 using a custom Java-based parser The Network Design XML document 305 may be validated against its schema 309 by any validating XML processor (e.g. XMLSpy)

The Network Design schema 309 is used to generate a metamodel in eCore 311 using standard EMF generative capabilities The eCore metamodel 311 is populated from the source Network Design XML document 305 using standard EMF parsing capabilities A series of two model transformations extract relevant data from the populated metamodels 310 and 311 and merge the contents into a single, coherent instance 313 of the Network Initialisation Data Catalogue metamodel 312

Constraints written on the Network Initialisation Data Catalogue metamodel 312 are applied to the model instance 313 to validate its contents and structure At this point the Network Initialisation Data Catalogue model instance 313 is ready to be used It should be noted that, whilst the metamodels are re-populated for any given network configuration (combination of INDE file 302 and Network Initialisation Data Catalogue 304), the underlying XML schemata (308 & 309) and metamodels (310 & 311) would only require amendment and re-generation in response to change of structure to the source material. Similarly, the target Network Initialisation Data Catalogue metamodel and associated transformations 312 would only require amendment in response to a change of structure to the source metamodels (310 & 311).

Once the overarching metamodel 312 is populated to produce an instantiated model 314, it can be checked against a number of well-formedness constraints and queried/modified. Population of the overarching metamodel 312 from the XML source material and well-formedness checking can be automatic, requiring no user intervention other than identification of the relevant source material to be used. No known systems generate an explicit metamodel of the network design of this kind.

Figure 4:
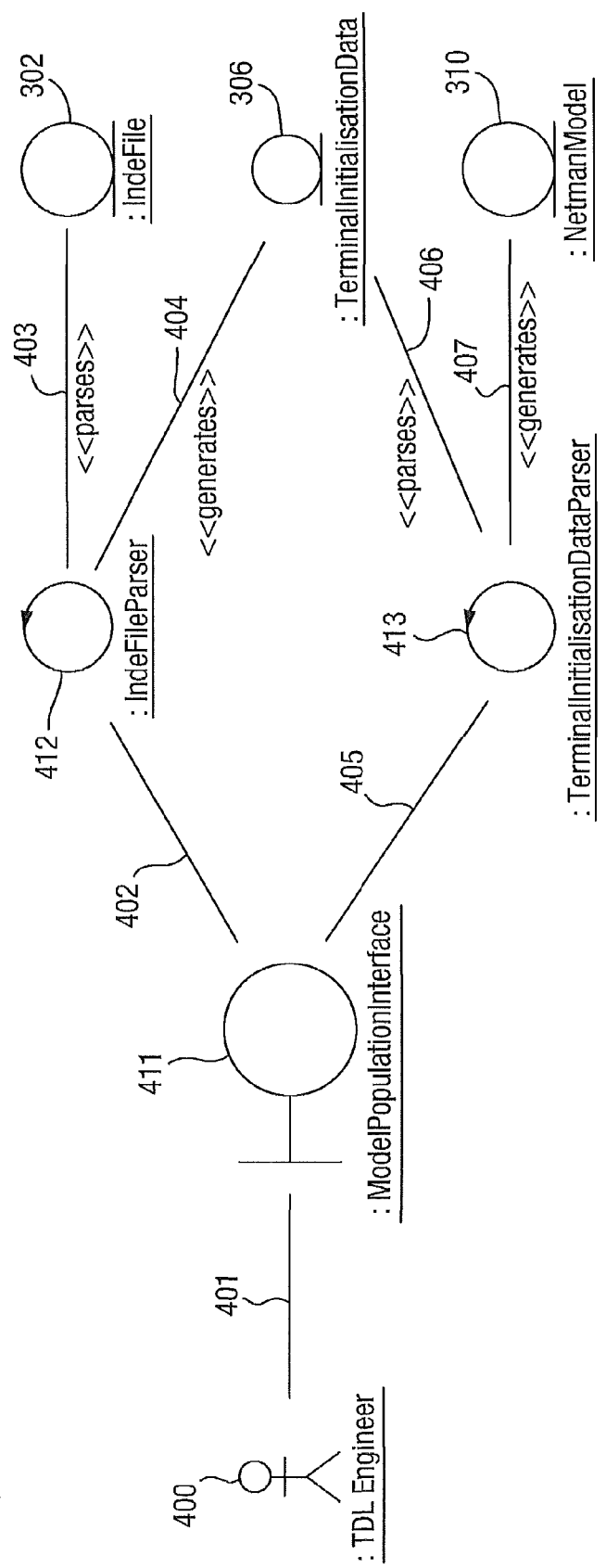

FIG. 4 is a UML-like collaboration diagram for creation of the terminal initialisation components of the model. The skilled person will be capable of implementing the steps described in the Figures of the present application using any suitable programming language and/or data structures. It will further be appreciated that in alternative embodiments, some of the steps shown may be omitted and/or re-ordered. The TDL Engineer 400 creates 401 the Terminal Initialisation Model components via the Model Population user interface 411, which may be a custom application written in Java, for example. This allows the user to identify the relevant source data set to be used. The INDE file parser 412 parses 403 the INDE file 302 provided by the JDLMO and generates an equivalent document in XML. The source INDE file 302 contains the terminal initialisation data. The file is parsed 404 via the bespoke parser 412. The parsed INDE file is transformed into a semantically-equivalent XML document 306 and is validated against an XML schema 308.

A terminal initialisation data parser 413 is an auto-generated component in the Eclipse Modelling Framework; it is generated from the XML schema 308 for the Terminal Initialisation Data file. The XML schema is used to auto-generate 405 a metamodel of the INDE file in EMF (this metamodel is called "Netman"; this is the format used by the source INDE file). The parser 413 parses the Terminal Initialisation Data file 306 and the parser then generates 407 an instance of the Netman metamodel 310.

Figure 5:
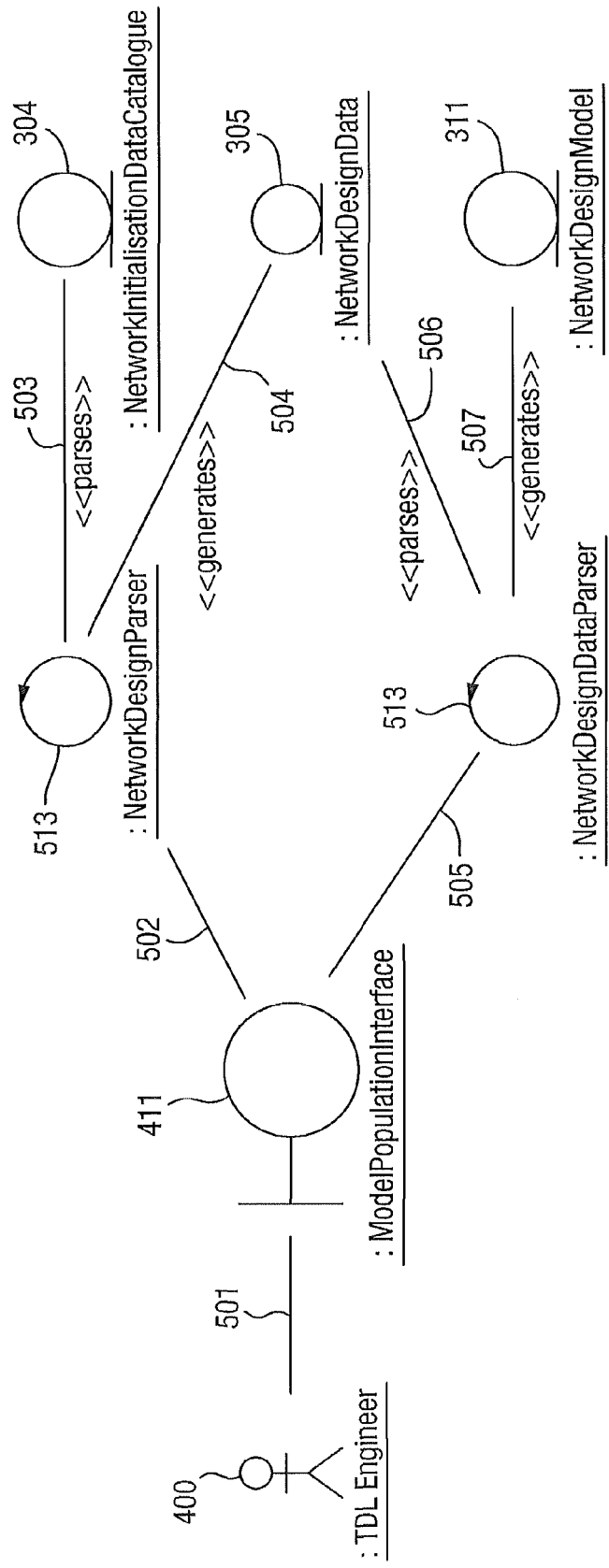

FIG. 5 is a collaboration diagram for creating the network design components of the model. The TDL Engineer 400 creates 501 the Network Design Model components via the Model Population user interface 411. This allows the user to identify the relevant source data set to be used. The Network Initialisation Data Catalogue parser 513 parses 502 a section of the Catalogue 304 provided by the JDLMO relating to the Network Design and generates an equivalent document in XML 305. The source Network Initialisation Data Catalogue section contains the network deign data. The file is parsed 503 via bespoke parser. The parsed network design data is transformed 504 into a semantically-equivalent XML document 305 and is validated against an XML schema 309.

The network design data parser 513 is an auto-generated component in the Eclipse Modelling Framework (EMF); it is generated from the XML schema 309 for the Network Design Data file. The XML schema is used to auto-generate a metamodel 311 of the Network Design section of the Network Initialisation Data Catalogue file in EMF. The parser 513 parses 506 the Network Design Data file. The parser 513 generates 507 an instance of the Network Design metamodel 311.

Figure 6:
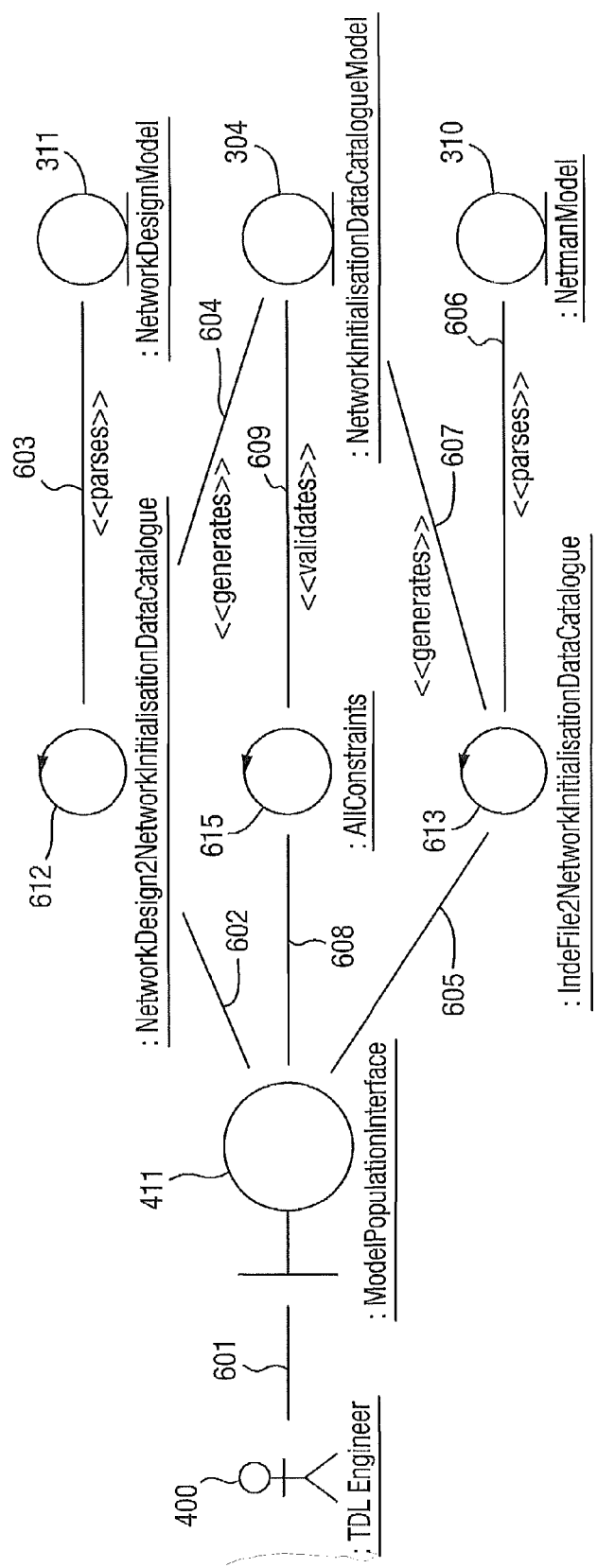

FIG. 6 is a collaboration diagram for merging the components described above in a single coherent model (the network initialisation data catalogue model). The TDL Engineer 400 creates 601 the Network Initialisation Data Catalogue Model from the components created in the above operations via the Model Population user interface 411. The Network Design to Network Initialisation Data Catalogue 612 transforms 602 the eCore Network Design Model into the relevant components of the target metamodel instance, the Network Design Data Catalogue model. The source Network Design model 311 is parsed (loaded) 603 into the model transformation. The network design model 311 is transformed 604 into instances of the relevant components of the Network Initialisation Data Catalogue.

The Inde File to Network Initialisation Data Catalogue 613 transforms 605 the eCore Netman model 310 into the relevant components of the target metamodel instance, the Network Design Data Catalogue model, and completes the integration with the model components populated by steps 602, 603 and 604. The source Netman model 310 is parsed (loaded) 606 into the model transformation. The Netman model is transformed 607 into instances of the relevant components of the Network Initialisation Data Catalogue and these components are integrated with those generated by the transformation of the Network Design model (steps 602, 603 and 604). The Network Initialisation Data Catalogue model is then validated 308 against a collection of constraints 615 defined over the model. The model is validated 609 against the defined constraints 615 and any failures are identified to the user.

At this point an instance of the metamodel of the Network Initialisation Data Catalogue has been instantiated and validated, and the TDL engineer can exercise the model by running queries over it. Examples of the types of queries that can be run will now be given, but the skilled person will understand that these are illustrative only; whilst the queries illustrated are non-destructive it would also be possible for queries/actions to amend the populated metamodel, e.g. to correct a constraint error or to amend the instance data in some way, such as changing a transmit timeslot to receive. In one embodiment, three queries over the network initialisation data catalogue can be performed; these are queries that would previously have been performed manually by the TDL engineers to ascertain the interoperability (at the timeslot level) of any two platforms in the network design:

1. Identify all timeslots transmitted by Platform A that may be received by Platform B (see FIG. 7)
2. Identify all timeslots transmitted by Platform A that may not be received by Platform B (see FIG. 8)
3. Identify all timeslots transmitted by Platform A and all timeslots received by Platform B (see FIG. 9)

In each case, the results returned by the relevant query are rendered in the form of a timeslot map, a format conforming to a generally accepted domain-specific standard with which the engineers in the field are familiar illustrating the timeslot groupings within the relevant set (carousel).

FIG. 7 is a collaboration diagram for identifying all timeslots transmitted by a first Platform A that may be received by a second Platform B. The TDL engineer 400 uses 701 the model querying interface to identify the platforms to be used in the comparison. Each platform is identified by selecting: the community within which the platform is to operate, the platform itself, and finally the data set to be used. The model querying interface 411 passes 702 the platform data to the query 711. The query is executed 703 over the network initialisation data catalogue model 312 to identify all timeslots transmitted by platform A that may be received by platform B. The TDL engineer switches 704 to the Timeslot Map view 712 to observe the results of the query. The Timeslot Map view renders 705 the result 714 returned by the query.

FIG. 8 is a collaboration diagram for identifying all timeslots transmitted by a first Platform A that may not be received by a second Platform B. The TDL engineer 400 uses 801 the model querying interface 411 to identify the platforms to be used in the comparison. Each platform is identified by selecting: the community within which the platform is to operate, the platform itself, and the data set to be used. The model querying interface 411 passes 802 the platform data to the query 811. The query is executed 803 over the network initialisation data catalogue model 312 to identify all timeslots transmitted by platform A that that cannot be received by platform B. The TDL engineer switches 804 to the Timeslot Map view 812 to observe the result of the query. The Timeslot Map view 812 renders 805 the result returned by the query.

Figure 9:
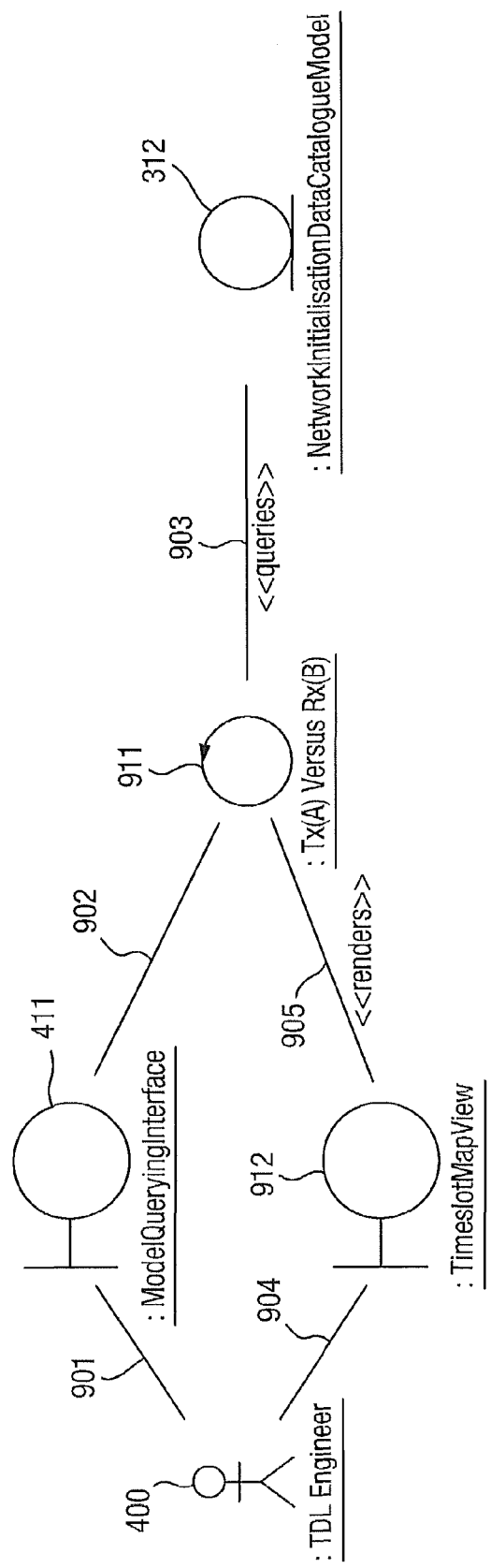

FIG. 9 is a collaboration diagram for identifying all timeslots transmitted by a first Platform A and all timeslots received by a second Platform B. The TDL engineer 400 uses 901 the model querying interface 411 to identify the platforms to be used in the comparison. Each platform is identified by selecting: the community within which the platform is to operate, the platform itself, and the data set to be used. The model querying interface 411 passes 902 the platform data to the query 911. The query is executed 903 over the network initialisation data catalogue model 312 to identify all timeslots transmitted by platform A and all timeslots received by platform B. The TDL engineer switches 904 to the Timeslot Map view 912 to observe the results of the query. The Timeslot Map view renders 905 the result returned by the query.

Figure 10:
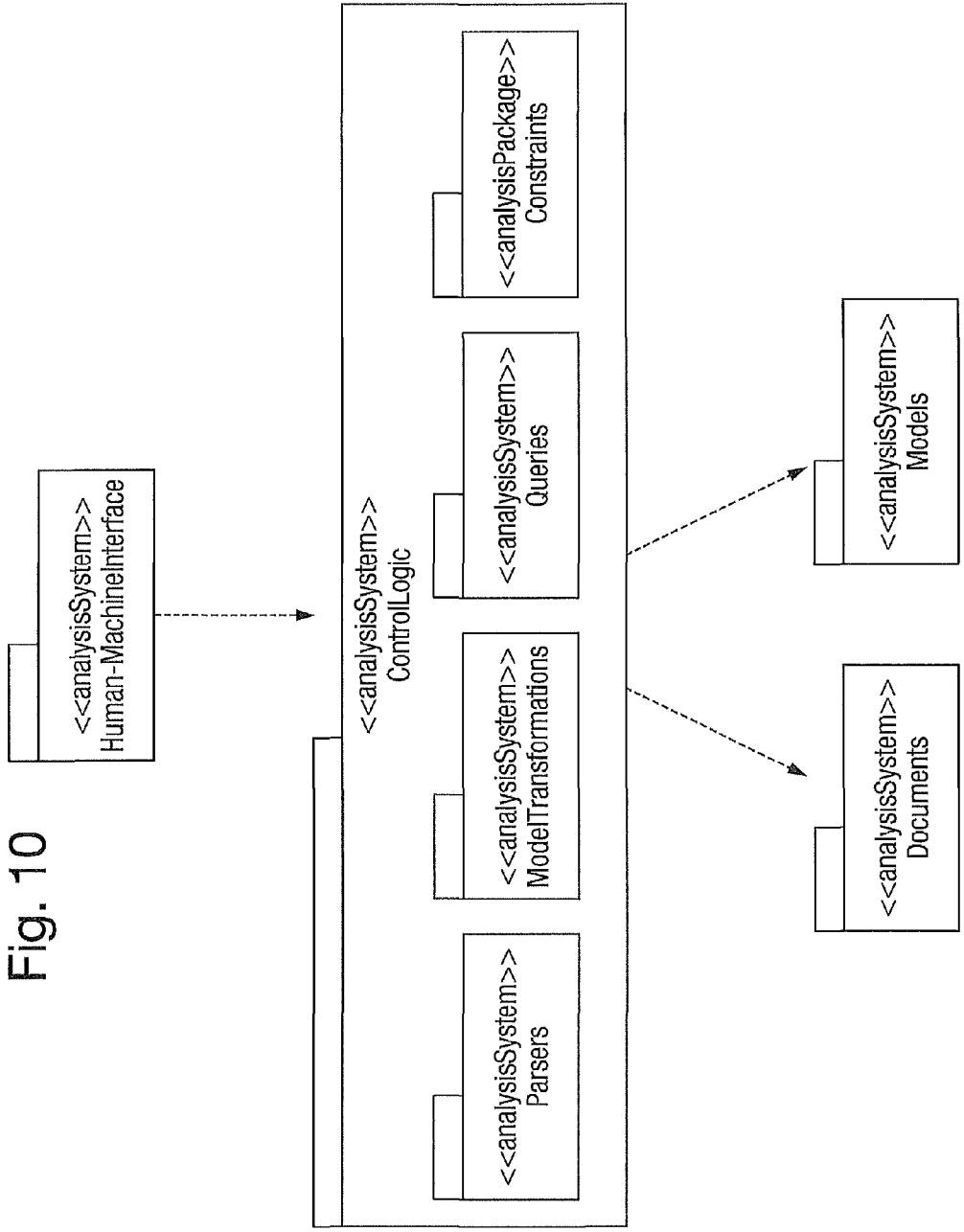

Having identified the relevant analysis classes (stereotyped as boundary, control and entity), it is possible to define an abstract system architecture and place each of the analysis classes in an analysis subsystem. A simple three-layer stack is adopted in the embodiment shown in FIG. 10; however, alternative architectures might be adopted. The abstract system architecture (analysis subsystems) is realised via a two-layered design model. The top layer provides the human-machine interface (HMI) services and can be implemented in Java, for example. The lower layer comprises the metamodels and all relevant operations, transformations, and constraints. This is implemented in Epsilon in one embodiment. The HMI component provides an interface to enable the TDL engineer to use the services provided by the Epsilon components. The use of alternative implementation technologies might result in the realisation adopting a different architectural structure.

Figure 11:
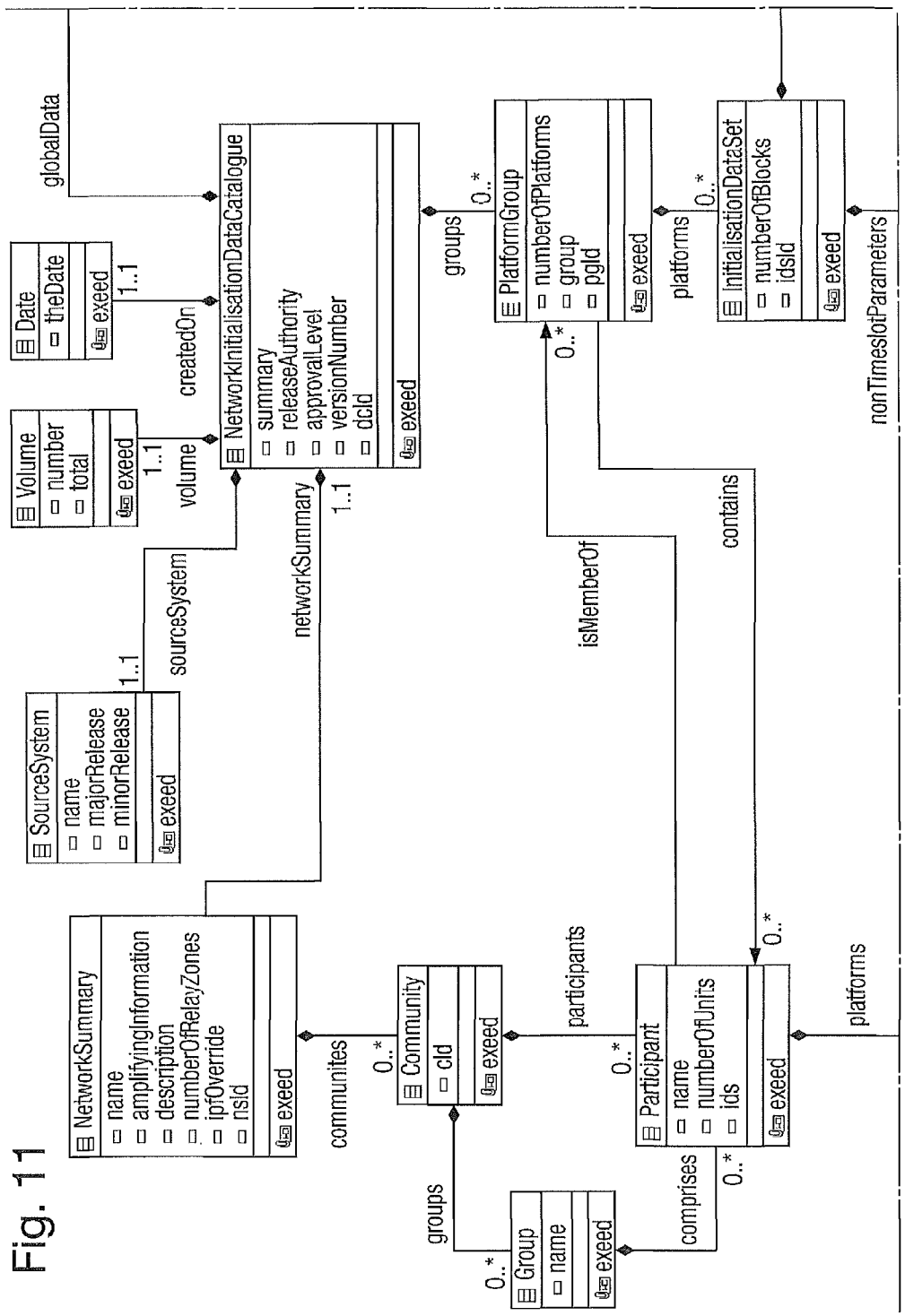

The package NetworkInitialisationDataCatalogue provides the user with access to the services required to populate and query the metamodels (via the HMI). An analysis of the INDE file and the Network Design documentation provided by the JDLMO drove the present inventors to develop the NetworkInitialisationDataCatalogue metamodel, which is shown in FIG. 11. The present specification will focus on those elements central to providing support for the three timeslot queries illustrated in FIG. 7 through FIG. 9.

Figure 12:
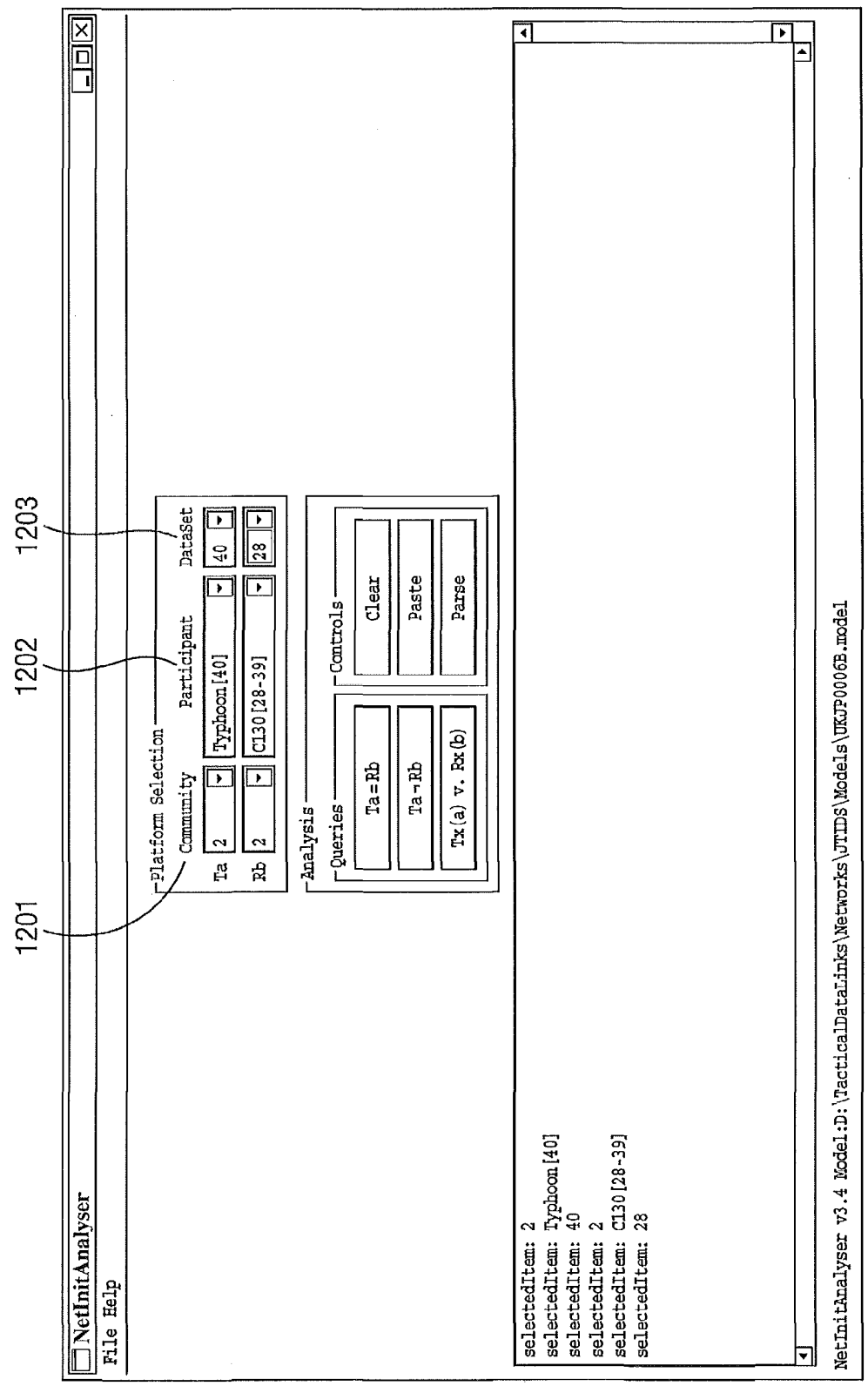
FIG. 12 is an example screen display of the timeslot interoperability analysis software application.

With regard to the timeslot analysis queries, the main class of interest is InitialisationDataSet. Each query takes one initialisation data set instance for the transmitting platform and one for the receiving platform; it is reasonable for these two platform instances to be the same, e.g. one would do this if one wished to establish the timeslot interoperability of one (e.g. Typhoon) aircraft with another. The Java HMI component queries the instantiated domain metamodel to allow the user to identify valid initialisation data set instances by completing the fields identified by the comboboxes in the order: Community 1201, Participant 1202, Data Set 1203 (see FIG. 12). As a Community object contains a number of Participant objects, and a Participant object may contain one or more Data Sets.

Figure 13:
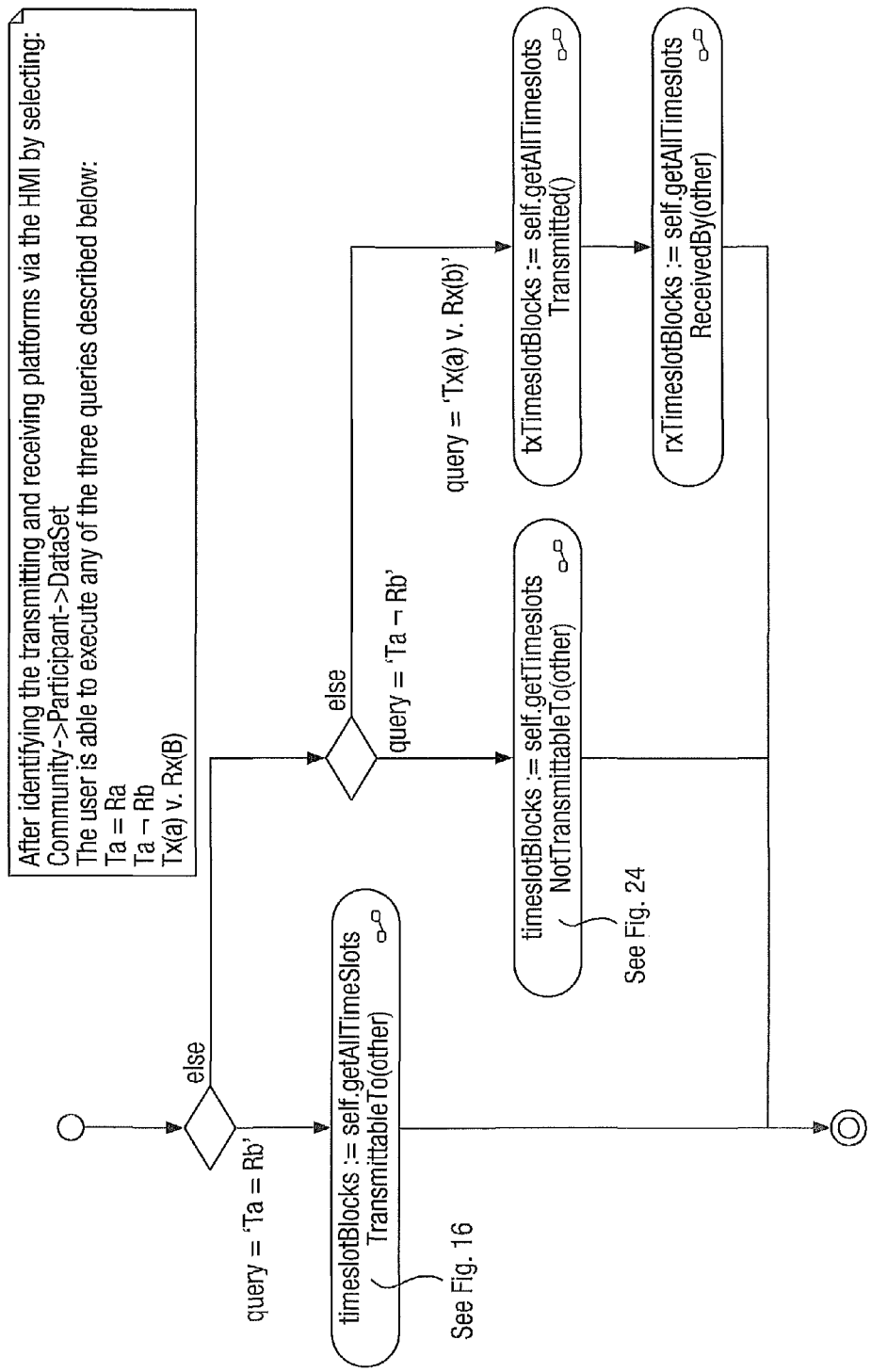
FIGS. 13 to 23 are charts illustrating steps performed during querying operations and the primary domain concepts of relevance to such.

Each of the above three queries is defined on class IntialisationDataSet and each query will be described in more detail below. FIG. 13 is provided for illustrative purposes only as the selection of the query to execute is performed via the Java HMI component.

The example queries fall into two broad categories:

Queries returning a single collection of timeslot blocks

Queries returning a collection of timeslot blocks for each platform queried

It can be seen from FIG. 13 that the queries 'Ta=Rb' and 'Ta¬= Rb' fall into the first category and the query 'Tx(a) v. Rx(b)' falls into the second category.

Figure 14:
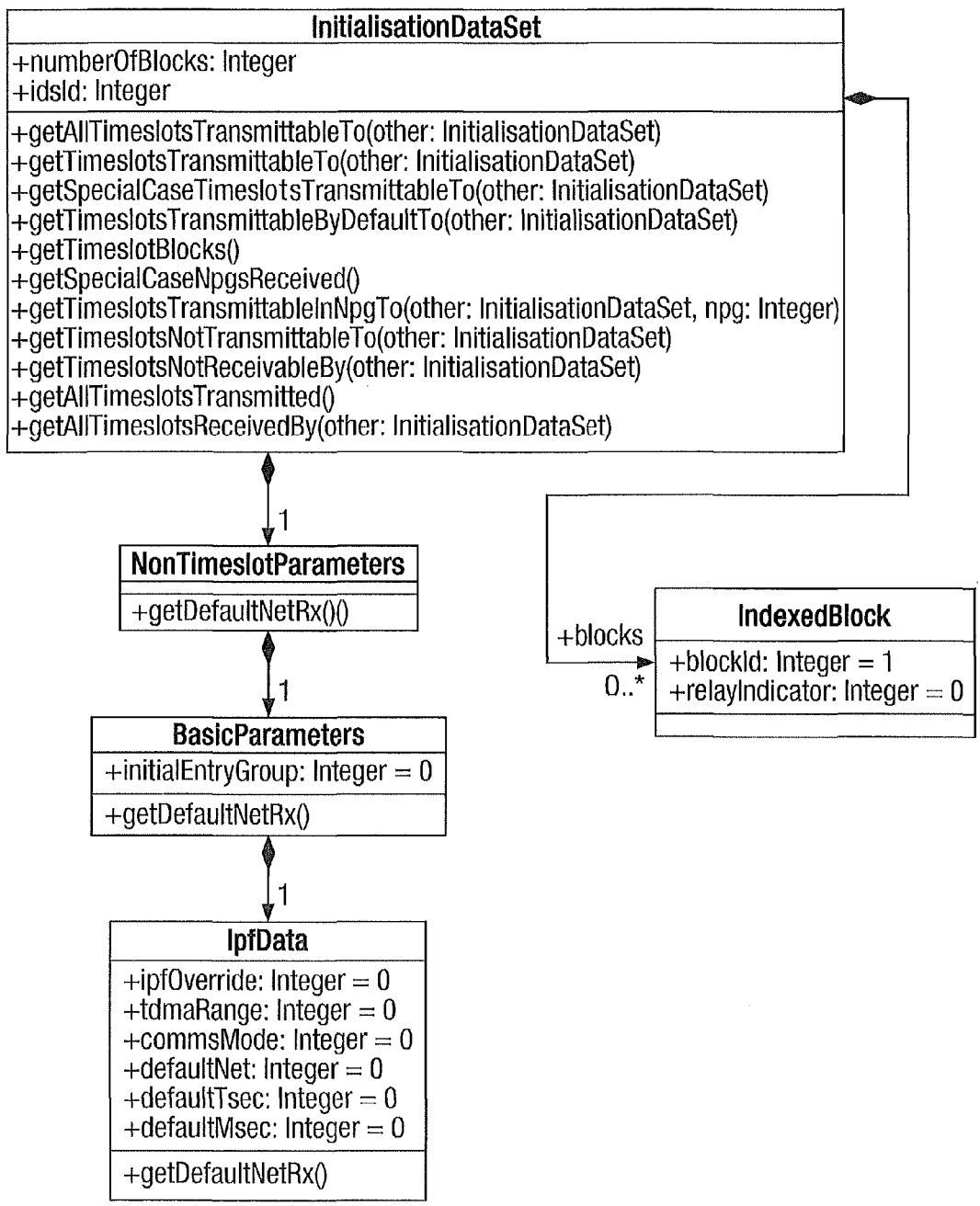
Figure 15:
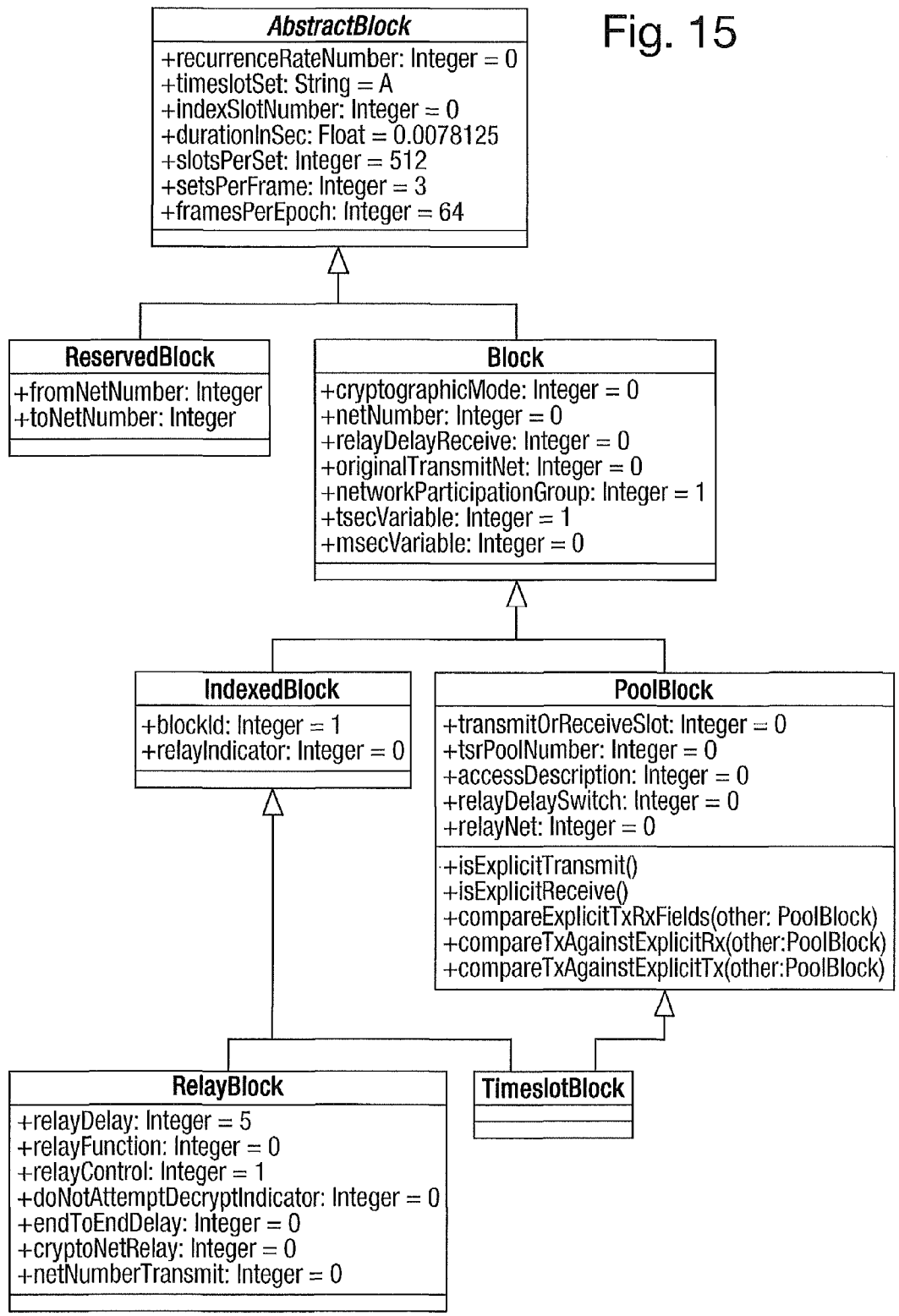

The query Ta=Rb requires identification of the collection of timeslots which may be transmitted by platform A and which may be received by platform B. Each initialisation data set is associated with a collection of timeslot blocks (IndexedBlock) and a collection of NonTimeslotParameters as illustrated in FIG. 14. The class IndexedBlock is a member of the AbstractBlock inheritance hierarchy and encapsulates all relevant timeslot block information for the initialisation data set via its attributes and those inherited (see FIG. 15).

Although the AbstractBlock inheritance hierarchy provides information to allow identification of, for example, whether the timeslot block is transmitted or received, and in which Network Participation Group (NPG), further information is required to identify the Tx/Rx interoperability between two platforms. The associated aggregation hierarchy provided by class NonTimeslotParameters provides access to the attributes needed to infer additional implicit Tx/Rx characteristics, such as the defaultNet—a platform implicitly is able to receive all timeslots transmitted in its default net. There are also a number of special case NPGs that may be received by any platform, and these too must be considered when forming a view of the Tx/Rx timeslot interoperability between two platforms.

Figure 16:
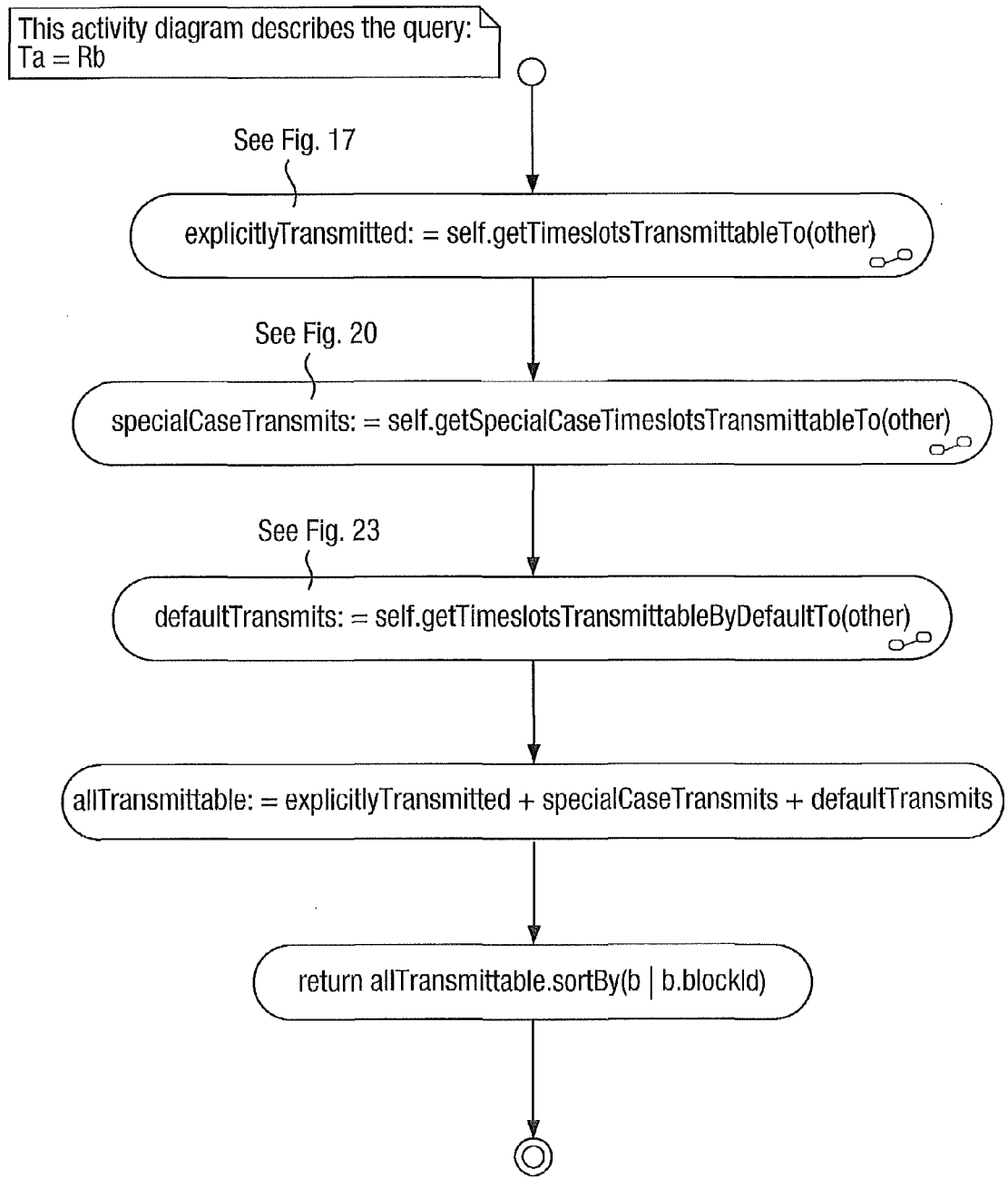

The query Ta=Rb must consider the explicit Tx/Rx characteristics and the implicit Tx/Rx characteristics; the latter comprising both special case and default net characteristics. This situation is illustrated in the top level activity diagram for the query (implemented as getAllTimeslotsTransmittableTo (other)), see FIG. 16.

Hence, the result of the query Ta=Rb (getAllTimeslotsTransmittableTo( )) is the union of the three timeslot collections, each of which is implemented as another query over the model:

All timeslots explicitly transmittable from platform A to B.

All special case timeslots transmitted from A to B.

All timeslots transmitted from A to B via platform B's default net.

Figure 17:
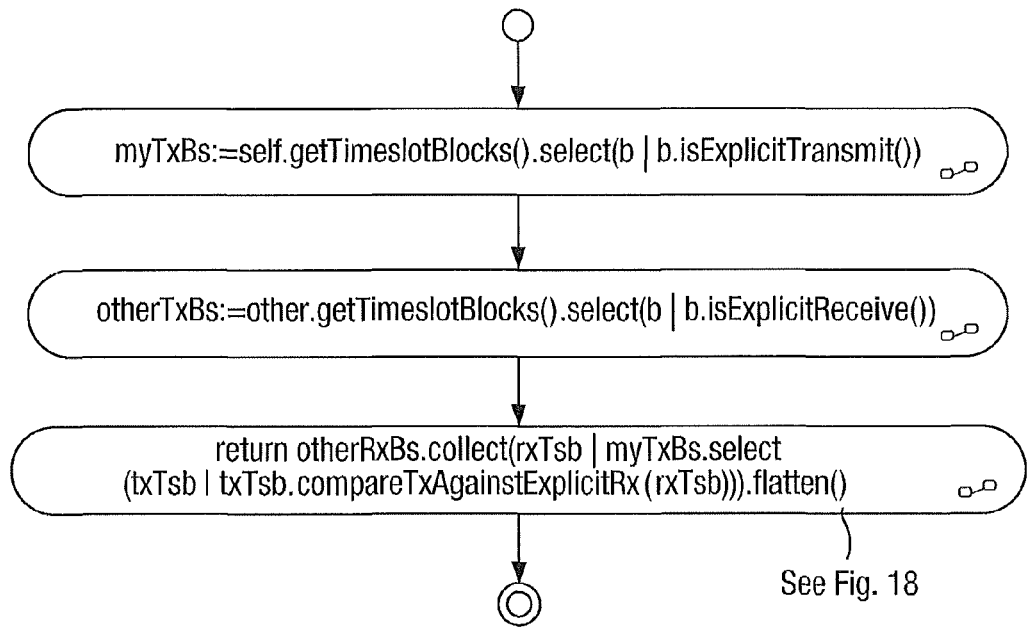

Each of the above queries is described in more detail below. The final statement in the activity diagram simply sorts the timeslots on their blockId attribute. All timeslots explicitly transmittable from platform A to B are identified via the query getTimeslotsTransmittableTo (other), as illustrated in FIG. 17.

Figure 18:
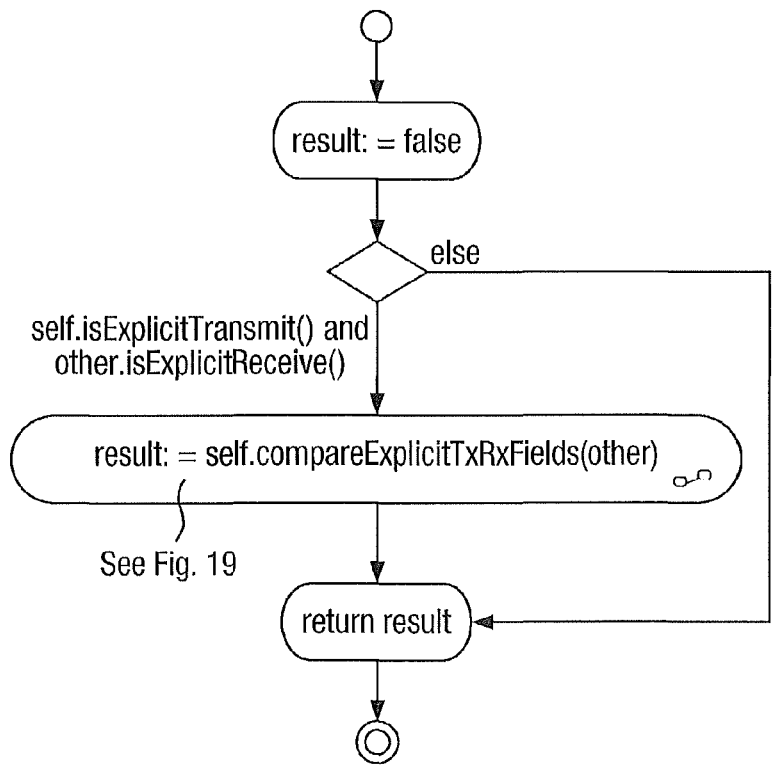

Query getTimeslotBlocksTransmittableTo( ) identifies all timeslot blocks transmitted by platform A (myTxBs) and all timeslot blocks received by platform B (otherTxBs), it then returns the collection of timeslot blocks transmitted which may be received explicitly by comparing each transmitted timeslot block (txTsb) against each received timeslot block (rxTsb); this is achieved via the query txTsb.compareTxAgainstExplicitRx(rxTsb) on class PoolBlock (see FIG. 18).

Figure 19:
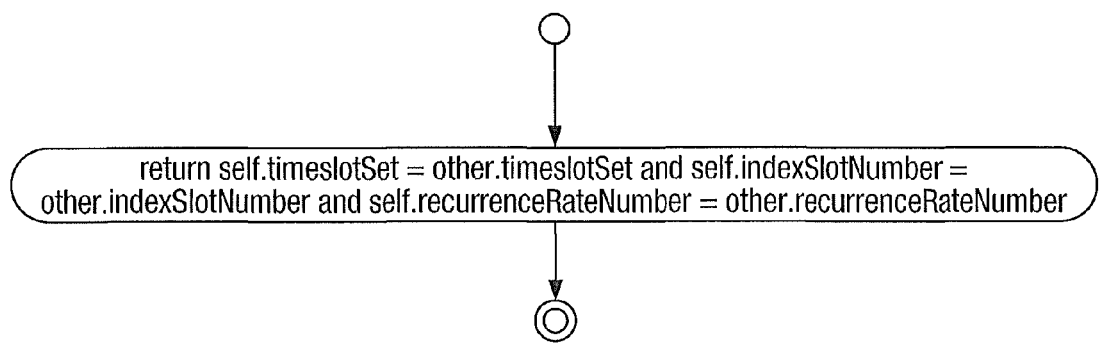

Query compareTxAgainstExplicitRx( ) is called with two instances of TimeslotBlock (self and other), it checks that the timeslot block 'self' is an explicit transmit and that 'other' is an explicit receive (an explicit transmit is indicated via the attribute transmitOrReceiveSlot [on class PoolBlock] being set to 1, and an explicit receive is indicated by it being set to 0). If self is an explicitly transmitted timeslot block and other is an explicitly received timeslot block then self may be transmitted to other if their explicit transmit/receive fields are compatible; this compatibility check is provided by the query compareExplicitTxRxFields( ), see FIG. 19.

Query compareExplicitTxRxFields( ) states simply that the timeslot block self may be received by the timeslot block other if all of the following are true:

Both self and other are in the same timeslot set {A, B, C}.

Both self and other have the same index slot number (ISN).

Both self and other have the same recurrence rate number (RRN).

Figure 20:
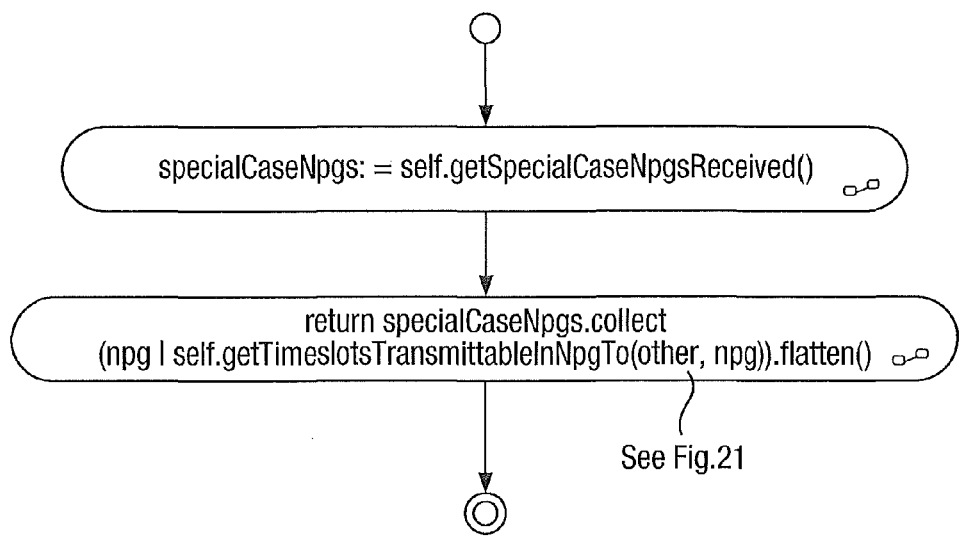

Returning to FIG. 16, this completes the description of the identification of all timeslot blocks that may be transmitted by platform A and received by platform B and for which the tx/rx attributes are defined explicitly. The next step is to identify all special case timeslot blocks transmitted by platform A that may be received by platform B. The set of such special case timeslot blocks comprises those timeslot blocks transmitted by platform A in specific NPGs and this is illustrated in FIG. 20.

Figure 21:
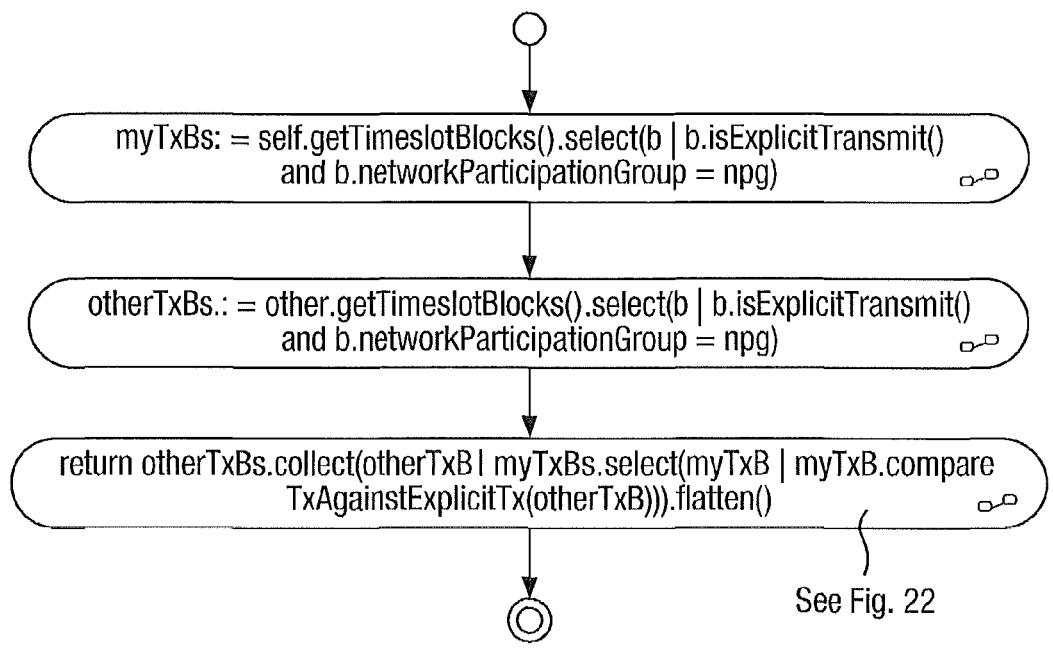

The set of specific NPGs used is: {2, 3, 12, 13} can be hard-coded into the current tool; however, it can be preferable to export default values to the HMI to allow the user to change (and save) the values on an ad-hoc basis. Having identified the set of special case NPGs for which the receiver will have the ability to receive, it is then necessary to identify which (if any) timeslot blocks the transmitting platform may transmit within these NPGs, and this is performed by the query getTimeslotsTransmittableInNpgTo( ), see FIG. 21.

Figure 22:
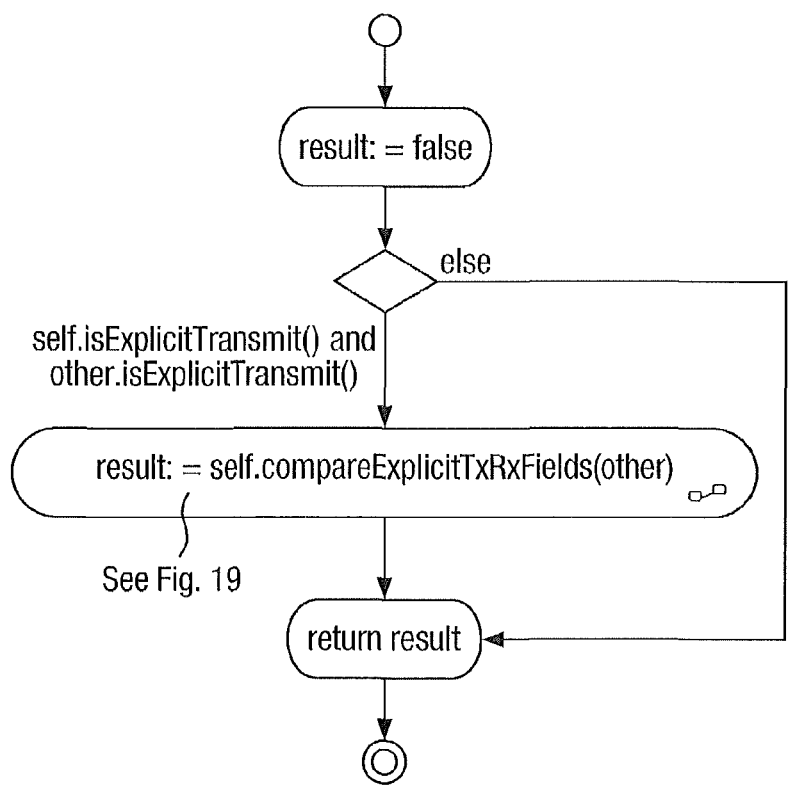

The special case timeslot blocks identified are timeslot blocks transmitted by platform A which platform B could receive if it is not already using these to transmit, hence for each special case NPG all explicit timeslot blocks transmitted by platform A in the NPG (myTxBs) are identified, and all explicit timeslot blocks transmitted by platform B within the same NPG (otherTxBs) are also identified. The result is then identified via the query compareTxAgainstExplicitTx( ), see FIG. 22.

Figure 23:
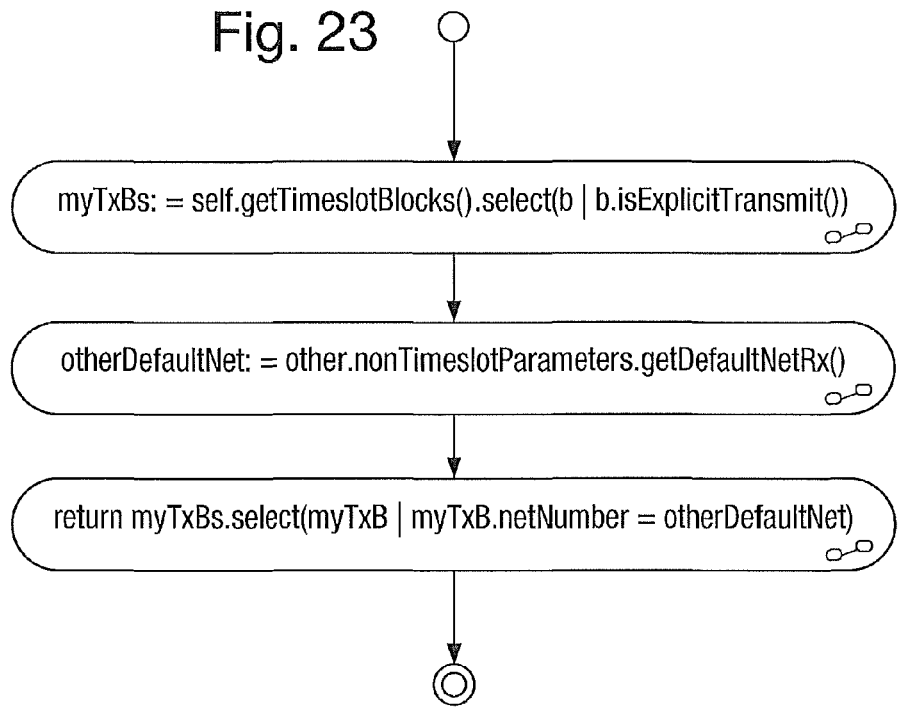

Query compareTxAgainstExplicitTx( ) confirms that both self and other are identified as being explicitly transmitted timeslot blocks before comparing their tx/rx compatibility, i.e. we are accommodating the possibility that the transmit timeslot block of platform B (other) may be used as a receive timeslot block within the special case NPG. Returning to FIG. 16, this completes the description of the identification of all timeslot blocks that may be transmitted by platform A and received by platform B via the special case NPGs. The final step is to identify all timeslot blocks transmitted by platform A by default (implicitly) which may be received by platform B, and this is illustrated in FIG. 23.

In order to identify the timeslot blocks transmitted by platform A which may be received by platform B via its default net it is necessary to identify all timeslot blocks explicitly transmitted by platform A (myTxBs) and identify platform B's default net number via the association from class InitialisationDataSet to the NonTimeslotParameters aggregation hierarchy (FIG. 14). The set of timeslot blocks which may be received by platform B via its default net number is simply the set of timeslot blocks transmitted by platform A on platform B's default net number.

Figure 24:
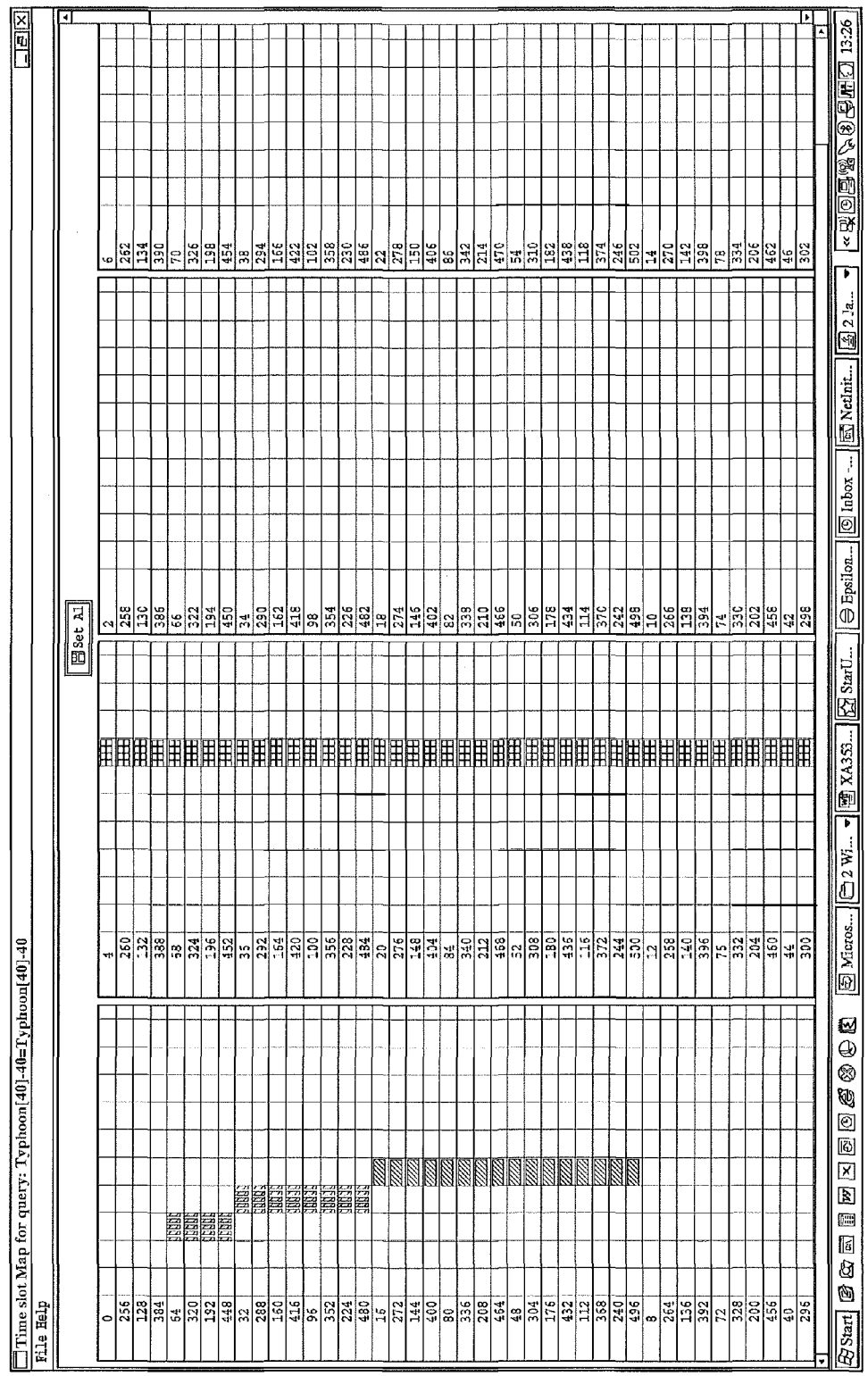
FIG. 24 is an example screen display of a timeslot map produced by the application.

The result of running the query Ta=Rb is a single collection of timeslot blocks, the HMI renders this collection in the form of a Timeslot Map as illustrated in FIG. 24, additional queries on the relevant objects allow the HMI to apply the necessary NPG colour coding and timeslot tooltips.

Figure 25:
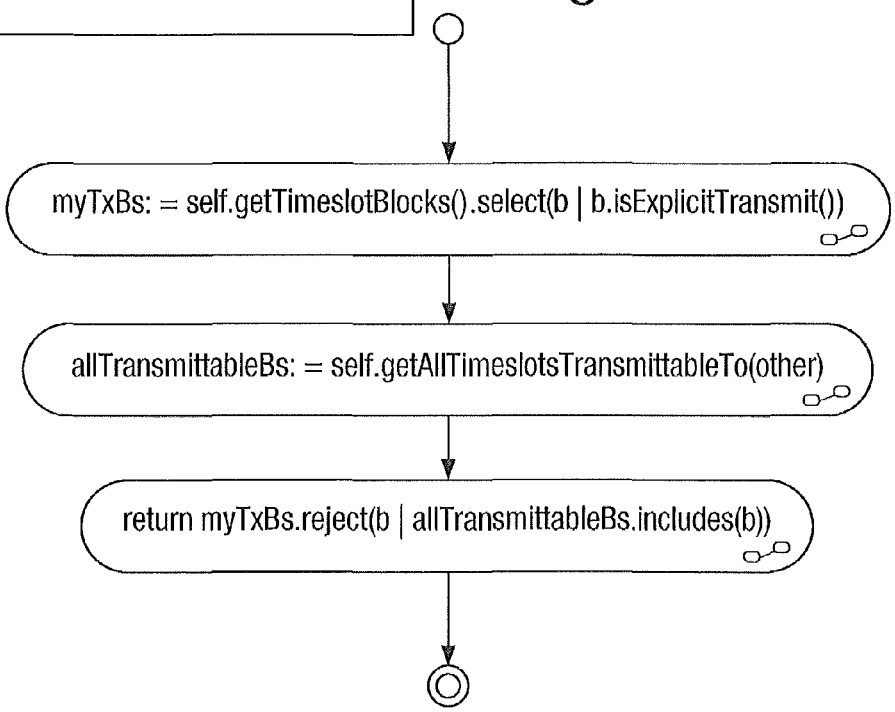
FIG. 25 is a chart illustrating steps performed during a querying operation.

The query Ta=¬Rb requires identification of all timeslot blocks transmitted by platform A which platform B is unable to receive. Given the description provided above to ascertain the set of timeslot blocks that may be transmitted by platform A and received by platform B, this is a straightforward task and is illustrated in FIG. 25. The collection of all timeslot blocks explicitly transmitted by platform A (myTxBs) is identified and then the collection of all timeslot blocks which may be transmitted by platform A and received by platform B, as described above (allTranmittableBs), then the collection of timeslot blocks transmitted by platform A which cannot be received by platform B is the set difference: myTxBs/allTransmittableBs. It is possible to compute this value by iterating over the set myTxBs and rejecting all elements that are also in allTransmittableBs, leaving the set difference.

The result of running the query Ta=¬Rb is a single collection of timeslot blocks, the HMI renders this collection in the form of a Timeslot Map as per the query Ta=Rb (see above) as illustrated in FIG. 24.

The query Tx (a) v. Rx (b) requires identification of all timeslot blocks transmitted by platform A and all timeslot blocks received by platform B such that a simple transmit versus receive graphic may be rendered, e.g. see FIG. 26. That Figure illustrates the timeslots transmitted by platform A in the left-hand column and the timeslots receive by platform B in the right-hand column; for the purposes of this query the user is only interested in the fact that a timeslot block is either transmitted or received and the graphical rendering of the results does not explicitly account for the respective RRNs (as was the case for the queries described above), although the RRN is visible via an associated tooltip when the mouse is placed over any of the rendered timeslot blocks.

Figure 27:
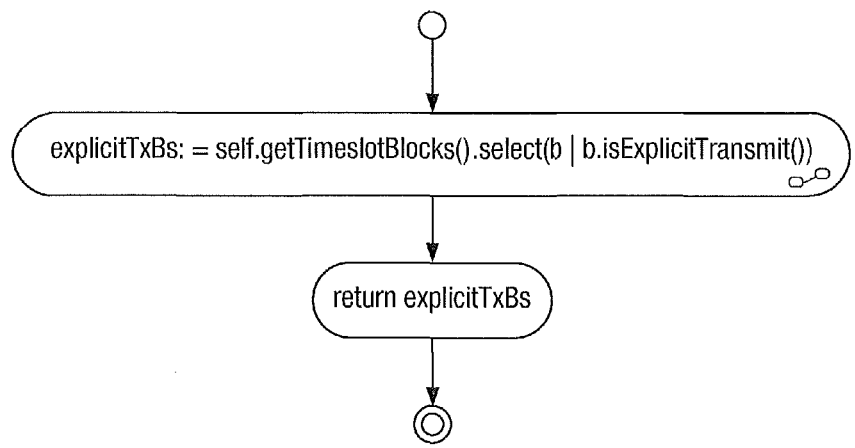
FIGS. 27 to 28 are charts illustrating further steps performed during querying operations.

The collection of timeslot blocks transmitted by platform A are returned by the query getAllTimeslotsTransmitted( ) on class InitialisationDataSet, see FIG. 27.

Figure 28:
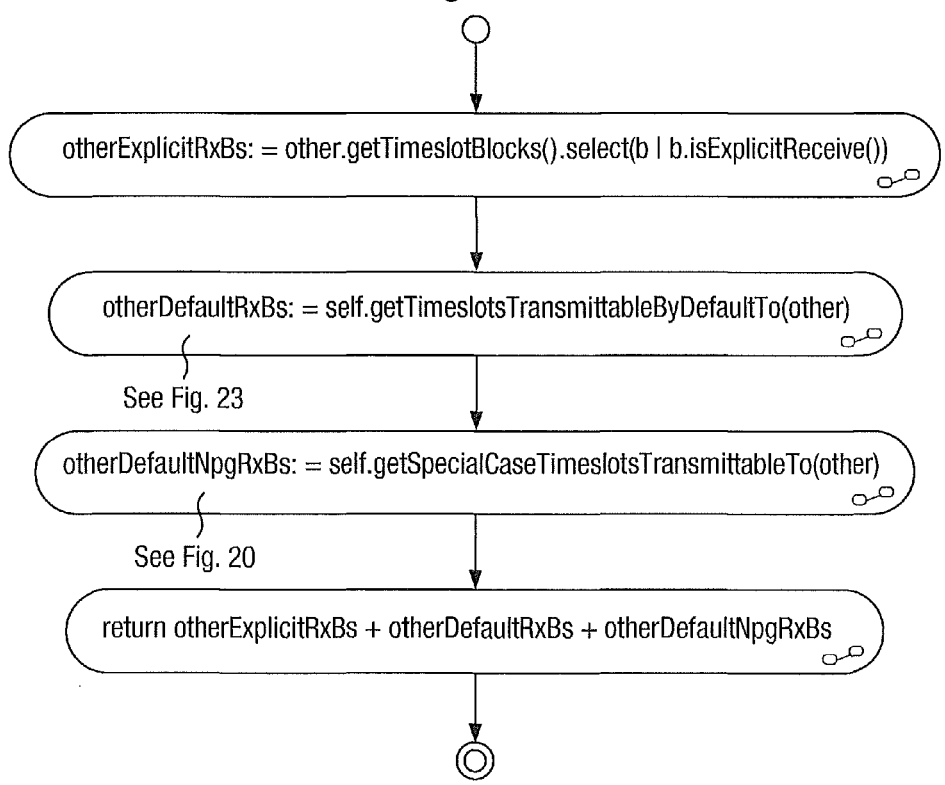

The collection of timeslots received by platform B are returned by the query getAllTimeslotsReceivedBy(other) on class InitialisationDataSet, where other is the formal parameter relating to platform B, see FIG. 28.

In this query it is necessary to accommodate both the timeslot blocks received explicitly by platform B and also those which may be received via the default net and the special case NPGs (both of these cases have been discussed above). Hence, the result of the query getAllTimeslotsRecievedBy( ) comprises the following sub-queries and returns the union of their results:

All timeslots explicitly received by platform B (regardless of the identity of the transmitting platform)
All timeslots received from platform A via platform B's default net
All special case timeslots received from platform A via the defined set of special case NPGs Embodiments of the Network Initialisation Analysis tool described herein provide an automated and extensible capability to assess the interoperability of TDL platforms in a given network design at the timeslot level. They also provide the ability to check the well-formedness of the network design against an explicit set of constraints derived from the NETMAN Interface Control Definition (ICD), clearly further constraints could be added as required; the model-based approach supports a more profound approach to constraint checking than simply range checking. Embodiments can provide a user interface and are able to execute specified queries in a matter of seconds, rendering results in the form of the domain-standard timeslot map, familiar to TDL practitioners working in this domain.

Although the results of the network design queries are rendered graphically in the form of timeslot maps, these are simply views over the model and alternative views can be provided. Embodiments of the invention provide an improvement over previous practices because they result in a significant improvement in terms of the time required to establish the interoperability of any two platforms in a given network design at the timeslot level. They can also improve the accessibility of the network design information by building on top of a high fidelity metamodel of the domain and providing access to a number of queries via simple menu-driven interface. Queries are executed in a matter of seconds and results can be rendered in a graphical format familiar to TDL practitioners. The use of high-fidelity models is pragmatic because it provides openness to support additional views of the TDL domain, reusing the relevant metamodels. The embodiments can provide underpinning high-fidelity executable metamodels that are open to extension and future re-use. Although the metamodels and tool described in the main example embodiment are aimed at the Link 16 TDL, the approach can applied to any TDMA-based communication protocol.

Beneficial features of the embodiments described herein include:
High fidelity metamodels of the domain with the associated well-formedness constraints
An explicit representation of the concept of timeslot interoperability
A rendering engine to present the results of the interoperability evaluation to users in a domain standard format

The invention claimed is:
1. A method of assessing timeslot compatibility between a first platform and a second platform communicating over a Time Division Multiple Access network, the method comprising:
obtaining, by a processor onboard one of the first platform and the second platform, data representing a metamodel of communication characteristics of the first platform and the second platform, said first platform having a first base standard and said second platform having a second base standard different than the first base standard, wherein said first and second base standards define said communication characteristics of said first and second platform respectively, the metamodel including a first information regarding at least transmit timeslots for transmission by the first platform, and a second information regarding at least receive timeslots for reception by the second platform;
querying, by the processor, the metamodel to assess compatibility between the transmit timeslots and the receive timeslots, wherein a transmit timeslot is assessed to be compatible with a receive timeslot when the transmit timeslot coincides in time with the receive timeslot, and is assessed to be not compatible otherwise; and outputting a timeslot compatibility map based on a result of the querying;
wherein obtaining data representing the metamodel comprises:
obtaining first and second network initiation source files for said first and second base standards respectively;
converting, when one or more of the source files is in a human-readable data catalogue format, said one or more source files in the human readable data catalogue format into a machine processable format; and
comparing each of the first and second source files with respective schematas, extracting respective relevant data from a first metamodel generated from the first source file and a second metamodel generated from the second source file and merging the respective relevant data into the metamodel.

2. A method according to claim 1, wherein said one or more source files include a human-readable Network Initialization Data Catalogue, and a machine-readable network initialization file.

3. A method according to claim 1, wherein the metamodel includes information regarding said receive timeslots corresponding to all timeslots transmitted in default net of the second platform.

4. A method according to claim 1, wherein the metamodel includes additional information relating to user-defined and/or domain-specific allocation of special case Network Participation Groups (NPGs) of which the first and the second platforms are members, the method comprising: identifying additional, non-standard timeslot compatibility between the first and the second platforms using the additional information.

5. A method according to claim 1, wherein the metamodel includes information regarding said receive timeslots based on any special case Network Participation Groups (NPGs) of which the second platform is a member.

6. A method according to claim 5, wherein special case NPG receive timeslots include timeslot blocks transmitted by the first platform which the second platform can receive whenever it is not using these timeslot blocks to transmit.

7. A method according to claim 1, wherein the query includes queries selected from a set: identifying the transmit timeslots of the first platform that the second platform is able to receive; identifying the transmit timeslots of the first platform that the second platform is unable to receive, and/or identifying all the transmit timeslots of the first platform and all the receive timeslots, of the second platform.

8. A method according to claim 1, wherein the Time Division Multiple Access network includes a Tactical Data Link (TDL) network.

9. A system for assessing timeslot compatibility between a first platform and a second platform communicating over a Time Division Multiple Access network, the system comprising:
a processor, onboard one of the first platform and the second platform, configured to:
obtain data representing a metamodel of communication characteristics of the first platform and the second platform said first platform having a first base standard and said second platform having a second base standard, wherein said first and second base standards define said communication characteristics of said first and second platform and said communication characteristics are different may or may not be the same for said first and second platforms, the metamodel including a first information regarding at least transmit timeslots for transmission by the first platform, and a second information regarding at least receive timeslots for reception by the second platform;
query the metamodel to assess compatibility between the transmit timeslots and the receive timeslots, wherein a transmit timeslot is assessed to be compatible with a receive timeslot when the transmit timeslot coincide in time with the receive timeslot, and is assessed to be not compatible otherwise; and
outputting a timeslot compatibility map based on a result of the querying;
wherein obtaining data representing the metamodel comprises:
obtaining first and second network initiation source files for said first and second base standards respectively;
converting, when one or more of the source files is in a human-readable data catalogue format, said one or more source files in the human readable data catalogue format into a machine processable format; and
comparing each of the first and second source files with respective schematas, extracting respective relevant data from a first metamodel generated from the first source file and a second metamodel generated from the second source file and merging the respective relevant data into the metamodel.

10. A computer program product comprising: computer code stored in a non-transitory computer readable medium which, upon execution by a computer, causes the computer to execute the method of claim 1.

* * * * *